US010643153B2

(12) United States Patent
O'Shea

(10) Patent No.: US 10,643,153 B2
(45) Date of Patent: May 5, 2020

(54) RADIO SIGNAL IDENTIFICATION, IDENTIFICATION SYSTEM LEARNING, AND IDENTIFIER DEPLOYMENT

(71) Applicant: Virginia Tech Intellectual Properties, Inc., Blacksburg, VA (US)

(72) Inventor: Timothy James O'Shea, Arlington, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 15/961,465

(22) Filed: Apr. 24, 2018

(65) Prior Publication Data
US 2018/0308013 A1    Oct. 25, 2018

Related U.S. Application Data

(60) Provisional application No. 62/489,055, filed on Apr. 24, 2017, provisional application No. 62/489,057, (Continued)

(51) Int. Cl.
*G06N 20/00*    (2019.01)
*H04W 24/08*    (2009.01)
(Continued)

(52) U.S. Cl.
CPC ........... *G06N 20/00* (2019.01); *G06N 3/0454* (2013.01); *G06N 3/08* (2013.01); *H04W 24/08* (2013.01)

(58) Field of Classification Search
CPC ......... G06N 99/005; G06N 20/00; G06N 3/04
See application file for complete search history.

(56) References Cited

U.S. PATENT DOCUMENTS 6,307,895 B1    10/2001  Alexander et al.
8,494,464 B1 *   7/2013  Kadambe ................. H04K 3/45
                                                   342/14
(Continued)

OTHER PUBLICATIONS

Xie, Xuanli Lisa, and Gerardo Beni. "A validity measure for fuzzy clustering." IEEE Transactions on Pattern Analysis & Machine Intelligence 8 (1991): 841-847.*
(Continued)

*Primary Examiner* — Eric Nilsson
(74) *Attorney, Agent, or Firm* — Fish & Richardson P.C.

(57) ABSTRACT

Methods, systems, and apparatus, including computer programs encoded on computer storage media, for training and deploying machine-learned identification of radio frequency (RF) signals. One of the methods includes: determining an RF signal configured to be transmitted through an RF band of a communication medium; determining first classification information that is associated with the RF signal, and that includes a representation of a characteristic of the RF signal or a characteristic of an environment in which the RF signal is communicated; using at least one machine-learning network to process the RF signal and generate second classification information as a prediction of the first classification information; calculating a measure of distance between (i) the second classification information that was generated by the at least one machine-learning network, and (ii) the first classification information associated with the RF signal; and updating the at least one machine-learning network based on the measure of distance.

36 Claims, 9 Drawing Sheets

Related U.S. Application Data filed on Apr. 24, 2017, provisional application No. 62/500,621, filed on May 3, 2017.

(51) Int. Cl.
*G06N 3/04* (2006.01)
*G06N 3/08* (2006.01)

(56) References Cited

U.S. PATENT DOCUMENTS

| | | | |
|---|---|---|---|
| 2004/0203826 A1 | 10/2004 | Sugar et al. | |
| 2006/0243180 A1 | 11/2006 | Sundermeyer et al. | |
| 2016/0127907 A1 | 5/2016 | Baxley et al. | |
| 2016/0127931 A1* | 5/2016 | Baxley | G01S 5/0263 455/67.16 |
| 2018/0091336 A1* | 3/2018 | Mody | H04B 17/391 |

OTHER PUBLICATIONS

Guo, Dongliang, et al. "Improved radio frequency identification indoor localization method via radial basis function neural network." Mathematical Problems in Engineering 2014 (2014).*
Shannon, C. E., "A Mathematical Theory of Communication", The Bell System Technical Journal 27, 3-55. ISSN: 1559-1662 (Jun. 1948).
Hinton, G. E. & Zemel, R. S. Autoencoders, minimum description length, and Helmholtz free energy. Advances in neural information processing systems, 3-3 (1994).
O'Shea, T. J., Corgan, J & Clancy, T. C. "Unsupervised Representation Learning of Structured Radio Communication Signals", arXiv preprint arXiv:1604.07078 (2016).
Jonathan Masci, Ueli Meier, Dan Cire, san, and Jüurgen Schmidhuber, "Stacked convolutional auto-encoders for hierarchical feature extraction", in Artificial Neural Networks and Machine Learning—ICANN 2011, Springer, 2011, pp. 52-59.
Vincent, P., Larochelle, H., Bengio, Y. & Manzagol, P.-A. In Proceedings of the 25th international conference on Machine learning (2008), 1096-1103.
Srivastava, N., Hinton, G., Krizhevsky, A., Sutskever, I. & Salakhutdinov, R. Dropout: A simple way to prevent neural networks from overfilling. The Journal of Machine Learning Research 15, 1929-1958 (2014).
Dauphin, Y. N., de Vries, H., Chung, J. & Bengio, Y., "RMSProp and equilibrated adaptive learning rates for non-convex optimization," arXiv preprint arXiv:1502.04390 (2015).
Kingma, D. & Ba, J. Adam, "A method for stochastic optimization", arXiv preprint arXiv:1412.6980 (2014).
Raviv, Y. & Intrator, N., "Bootstrapping with noise: An effective regularization technique. Connection Science", 8, 355-372 (1996).
Oetting, J. A comparison of modulation techniques for digital radio IEEE Transactions on communications 27, 1752-1762 (1979).
Jadelberg, M., Simonyan, K., Zisserman, A., et al. in Advances in Neural Information Processing Systems (2015), 2008-2016.
O'Shea, T. J., Pemula, L., Batra, D. & Clancy, T. C. "Radio Transformer Networks: Attention Models for Learning to Synchronize in Wireless Systems", arXiv preprint arXiv:1605.00716 (2016).
E. S. Sousa and S. Pasupathy, "Pulse shape design for teletext data transmission", Communications, IEEE Transactions on, vol. 31, No. 7, pp. 871-878, 1983.
B. Sklar, Digital communications. Prentice Hall NJ, 2001, vol. 2.
H. Lee, A. Battle, R. Raina, and A. Y. Ng, "Efficient sparse coding algorithms", in Advances in neural information processing systems, 2006, pp. 801-808.
C. Clancy, J. Hecker, E. Stuntebeck, and T. O'Shea, "Applications of machine learning to cognitive radio networks", Wireless Communications, IEEE, vol. 14, No. 4, pp. 47-52, 2007.
F. Chollet, Keras, https : / / github.com/ fchollet / keras, 2015.
T. J. O'Shea and J. Corgan, "Convolutional radio modulation recognition networks", CoRR, vol. abs/1602.04105, 2016. [Online]. Available: http://arxiv. org/abs/1602.04105.
PCT International Search Report and Written Opinion in International Appl. PCT/US2018/29148, dated Aug. 10, 2018, 17 pages.
PCT International Preliminary Report on Patentability in International Appln. No. PCT/US2018/029148, dated Nov. 7, 2019, 10 pages.
PCT Invitation to Pay Additional Fees in International Appln. PCT/US2018/29148, dated Jun. 15, 2018, 2 pages.

* cited by examiner

RADIO SIGNAL IDENTIFICATION, IDENTIFICATION SYSTEM LEARNING, AND IDENTIFIER DEPLOYMENT

CROSS-REFERENCE TO RELATED APPLICATIONS

This application claims priority to U.S. Provisional Application Nos. 62/489,055 and 62/489,057 both filed on Apr. 24, 2017, and 62/500,621 filed on May 3, 2017. The disclosures of these prior applications are considered part of and are incorporated by reference in the disclosure of this application.

TECHNICAL FIELD

The present disclosure relates to identification of radio frequency (RF) signals.

BACKGROUND

Radio frequency (RF) waveforms are prevalent in many systems for communication, storage, sensing, measurements, and monitoring. RF waveforms are transmitted and received through various types of communication media, such as over the air, under water, or through outer space. In some scenarios, RF waveforms transmit information that is modulated onto one or more carrier waveforms operating at RF frequencies. In other scenarios, RF waveforms are themselves information, such as outputs of sensors or probes. Information that is carried in RF waveforms is typically processed, stored, and/or transported through other forms of communication, such as through an internal system bus in a computer or through local or wide-area networks.

SUMMARY

In general, the subject matter described in this disclosure can be embodied in methods, apparatuses, and systems for training and deploying machine-learning networks to identify or process, or both, radio frequency (RF) signals.

In one aspect, a method is disclosed for training at least one machine-learning network to classify radio frequency (RF) signals. The method includes: determining an RF signal that is configured to be transmitted through an RF band of a communication medium; determining first classification information associated with the RF signal, the first classification information comprising a representation of at least one of a characteristic of the RF signal or a characteristic of an environment in which the RF signal is communicated; using at least one machine-learning network to process the RF signal and generate second classification information as a prediction of the first classification information; calculating a measure of distance between (i) the second classification information that was generated by the at least one machine-learning network, and (ii) the first classification information that was associated with the RF signal; and updating the at least one machine-learning network based on the measure of distance between the second classification information and the first classification information. Other implementations of this aspect include corresponding computer systems, apparatus, and computer programs recorded on one or more computer storage devices, each configured to cause at least one operably connected processor to perform the actions of the methods.

Implementations may include one or more of the following features. The method where the measure of distance between the second classification information and the first classification information includes at least one of (i) a cross-entropy between the second classification information and the first classification information, or (ii) a geometric distance metric between the second classification information and the first classification information. The method where the first classification information and the second classification information indicate at least one of (i) a type of modulation utilized to transmit the RF signal, (ii) a type of traffic, protocol, or standard that is carried by or that is utilized to transmit the RF signal, (iii) a type of hardware apparatus that transmits or receives the RF signal, (iv) a type of RF emission or a type of RF emission pattern occurring in the communication medium, or (v) a presence of one or more types of communications signals. The method where using the at least one machine-learning network to process the RF signal and generate the second classification information includes: determining a plurality of basis signals; processing the RF signal using the plurality of basis signals to generate a plurality of basis coefficients for the RF signal. The method may also include generating the second classification information based on the plurality of basis coefficients of the RF signal. The method where updating the at least one machine-learning network based on the measure of distance between the second classification information and the first classification information includes: updating the plurality of basis signals that are utilized to process RF signals, based on the measure of distance between the second classification information and the first classification information. The method where updating the at least one machine-learning network based on the measure of distance between the second classification information and the first classification information includes: determining an objective function that includes the measure of distance between the second classification information and the first classification information. The method may also include calculating a rate of change of the objective function relative to variations in the at least one machine-learning network. The method may also include selecting, based on the calculated rate of change of the objective function, a variation for the at least one machine-learning network. The method may also include updating the at least one machine-learning network based on the selected variation for the at least one machine-learning network. The method where the objective function includes a weighted combination of the measure of distance between the second classification information and the first classification information with at least one of: (i) a computational throughput or delay achieved by the at least one machine-learning network in classifying RF signals, (ii) a computational dwell time associated with the at least one machine-learning network in classifying RF signals, or (iii) a computational duty cycle associated with the at least one machine-learning network in classifying RF signals. The method where updating the at least one machine-learning network includes: updating at least one network weight or at least one connection in one or more layers of at least one artificial neural network that forms part of the at least one machine-learning network. The method where using the at least one machine-learning network to process the RF signal and generate the second classification information further includes: determining, based on the at least one machine-learning network, a first time scale for processing the RF signal. The method may also include using the at least one machine-learning network to processes the RF signal based on the first time scale. The method may also include where updating the at least one machine-learning network further includes updating the first time scale to a second time scale based on the measure of distance between the second classification information and the first classification information. The method where the RF signal includes at least one of an acoustic RF signal, an optical RF signal, or other analog RF signal that is configured to be transmitted and received by man-made RF communication systems. Implementations of the described techniques may include hardware, a method or process, or computer software on a computer-accessible medium. Implementations of the described techniques may include hardware, a method or process, or computer software on a computer-accessible medium.

In another aspect, a method is disclosed for deploying at least one machine-learning network that has been trained to classify radio frequency (RF) signals. The method includes: determining at least one machine-learning network has been trained to classify RF signals configured to be transmitted through an RF band of a communication medium; setting at least one parameter of an RF receiver based on the trained at least one machine-learning network; using the RF receiver to receive an analog RF waveform from an RF spectrum of the communication medium, and to process the analog RF waveform to generate a discrete-time representation of the analog RF waveform as a received RF signal; and using the at least one trained machine-learning network to process the received RF signal and generate predicted RF signal classification information, wherein the predicted RF signal classification information comprises a representation of at least one of a characteristic of the received RF signal or a characteristic of an environment in which the received RF signal was communicated. Other implementations of this aspect include corresponding computer systems, apparatus, and computer programs recorded on one or more computer storage devices, each configured to cause at least one operably connected processor to perform the actions of the methods.

Implementations may include one or more of the following features. The method where setting the at least one parameter of the RF receiver based on the at least one machine-learning network includes: setting at least one of a tuning parameter, a filtering parameter, a scheduling of operations, or a channelization parameter of the RF receiver according to the at least one trained machine-learning network, or according to updates to the at least one trained machine-learning network. The method where using the at least one trained machine-learning network to process the received RF signal and generate the predicted RF signal classification information includes: determining a plurality of basis signals; processing the received RF signal using the plurality of basis signals to generate a plurality of basis coefficients of the received RF signal. The method may also include perform classification on the plurality of basis coefficients of the received RF signal. The method may also include output a result of the classification as the predicted RF signal classification information. The method where the predicted RF signal classification information indicates at least one of (i) a type of modulation utilized to transmit the received RF signal, (ii) a type of traffic, protocol, or standard that is carried by or that is utilized to transmit the received RF signal, (iii) a type of hardware apparatus that transmits or receives the received RF signal, (iv) a type of RF emission or a type of RF emission pattern occurring in the communication medium, or (v) a presence of one or more types of communications signals. The method where the at least one trained machine-learning network includes at least one artificial neural network that has been trained using an objective function that includes a measure of distance between (i) known classification information for an RF training signal, and (ii) predicted classification information for the RF training signal that was generated by the at least one trained machine-learning network. Implementations of the described techniques may include hardware, a method or process, or computer software on a computer-accessible medium.

Another aspect includes a system including: at least one processor; and at least one computer memory that is operably connectable to the at least one processor and that has stored thereon instructions which, when executed by the at least one processor, cause the at least one processor to perform operations including: determining an RF signal that is configured to be transmitted through an RF band of a communication medium; determining first classification information associated with the RF signal, the first classification information including a representation of at least one of a characteristic of the RF signal or a characteristic of an environment in which the RF signal is communicated; using at least one machine-learning network to process the RF signal and generate second classification information as a prediction of the first classification information; calculating a measure of distance between (i) the second classification information that was generated by the at least one machine-learning network, and (ii) the first classification information that was associated with the RF signal; and updating the at least one machine-learning network based on the measure of distance between the second classification information and the first classification information. Other implementations of this aspect include corresponding computer systems, apparatus, and computer programs recorded on one or more computer storage devices, each configured to cause at least one operably connected processor to perform the actions of the methods.

Implementations may include one or more of the following features. The system where the measure of distance between the second classification information and the first classification information includes at least one of (i) a cross-entropy between the second classification information and the first classification information, or (ii) a geometric distance metric between the second classification information and the first classification information. The system where the first classification information and the second classification information indicate at least one of (i) a type of modulation utilized to transmit the RF signal, (ii) a type of traffic, protocol, or standard that is carried by or that is utilized to transmit the RF signal, (iii) a type of hardware apparatus that transmits or receives the RF signal, (iv) a type of RF emission or a type of RF emission patterns occurring in the communication medium, or (v) a presence of one or more types of communications signals. The system where using the at least one machine-learning network to process the RF signal and generate the second classification information includes: determining a plurality of basis signals; processing the RF signal using the plurality of basis signals to generate a plurality of basis coefficients for the RF signal. The system may also include generating the second classification information based on the plurality of basis coefficients of the RF signal. The system where updating the at least one machine-learning network based on the measure of distance between the second classification information and the first classification information includes: updating the plurality of basis signals that are utilized to process RF signals, based on the measure of distance between the second classification information and the first classification information. The system where updating the at least one machine-learning network based on the measure of distance between the second classification information and the first classification information includes: determining an objective function that includes the measure of distance between the second classification information and the first classification information. The system may also include calculating a rate of change of the objective function relative to variations in the at least one machine-learning network. The system may also include selecting, based on the calculated rate of change of the objective function, a variation for the at least one machine-learning network. The system may also include updating the at least one machine-learning network based on the selected variation for the at least one machine-learning network. The system where the objective function includes a weighted combination of the measure of distance between the second classification information and the first classification information with at least one of: (i) a computational throughput or delay achieved by the at least one machine-learning network in classifying RF signals, (ii) a computational dwell time associated with the at least one machine-learning network in classifying RF signals, or (iii) a computational duty cycle associated with the at least one machine-learning network in classifying RF signals. The system where updating the at least one machine-learning network includes: updating at least one network weight or at least one connection in one or more layers of at least one artificial neural network that forms part of the at least one machine-learning network. The system where using the at least one machine-learning network to process the RF signal and generate the second classification information further includes: determining, based on the at least one machine-learning network, a first time scale for processing the RF signal. The system may also include using the at least one machine-learning network to processes the RF signal based on the first time scale. The system may also include where updating the at least one machine-learning network further includes updating the first time scale to a second time scale based on the measure of distance between the second classification information and the first classification information. The system where the RF signal includes at least one of an acoustic RF signal, an optical RF signal, or other analog RF signal that is configured to be transmitted and received by man-made RF communication systems. Implementations of the described techniques may include hardware, a method or process, or computer software on a computer-accessible medium.

Another aspect includes a system including: at least one processor; and at least one computer memory that is operably connectable to the at least one processor and that has stored thereon instructions which, when executed by the at least one processor, cause the at least one processor to perform operations including: determining at least one machine-learning network has been trained to classify RF signals configured to be transmitted through an RF band of a communication medium; setting at least one parameter of an RF receiver based on the at least one trained machine-learning network; using the RF receiver to receive an analog RF waveform from an RF spectrum of the communication medium, and to process the analog RF waveform to generate a discrete-time representation of the analog RF waveform as a received RF signal; and using the at least one trained machine-learning network to process the received RF signal and generate predicted RF signal classification information, where the predicted RF signal classification information includes a representation of at least one of a characteristic of the received RF signal or a characteristic of an environment in which the received RF signal was communicated. Other implementations of this aspect include corresponding computer systems, apparatus, and computer programs recorded on one or more computer storage devices, each configured to cause at least one operably connected processor to perform the actions of the methods.

Implementations may include one or more of the following features. The system where setting the at least one parameter of the RF receiver based on the at least one machine-learning network includes: setting at least one of a tuning parameter, a filtering parameter, or a channelization parameter of the RF receiver according to the at least one trained machine-learning network, or according to updates to the at least one trained machine-learning network. The system where using the at least one trained machine-learning network to process the received RF signal and generate the predicted RF signal classification information includes: determining a plurality of basis signals; processing the received RF signal using the plurality of basis signals to generate a plurality of basis coefficients of the received RF signal. The system may also include perform classification on the plurality of basis coefficients of the received RF signal. The system may also include output a result of the classification as the predicted RF signal classification information. The system where the predicted RF signal classification information indicates at least one of (i) a type of modulation utilized to transmit the received RF signal, (ii) a type of traffic, protocol, or standard that is carried by or that is utilized to transmit the received RF signal, (iii) a type of hardware apparatus that transmits or receives the received RF signal, (iv) a type of RF emission or a type of RF emission pattern sequence occurring in the communication medium, or (v) a presence of one or more types of communications signals. The system where the at least one trained machine-learning network includes at least one artificial neural network that has been trained using an objective function that includes a measure of distance between (i) known classification information for an RF training signal, and (ii) predicted classification information for the RF training signal that was generated by the at least one trained machine-learning network. Implementations of the described techniques may include hardware, a method or process, or computer software on a computer-accessible medium.

Other implementations of this and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
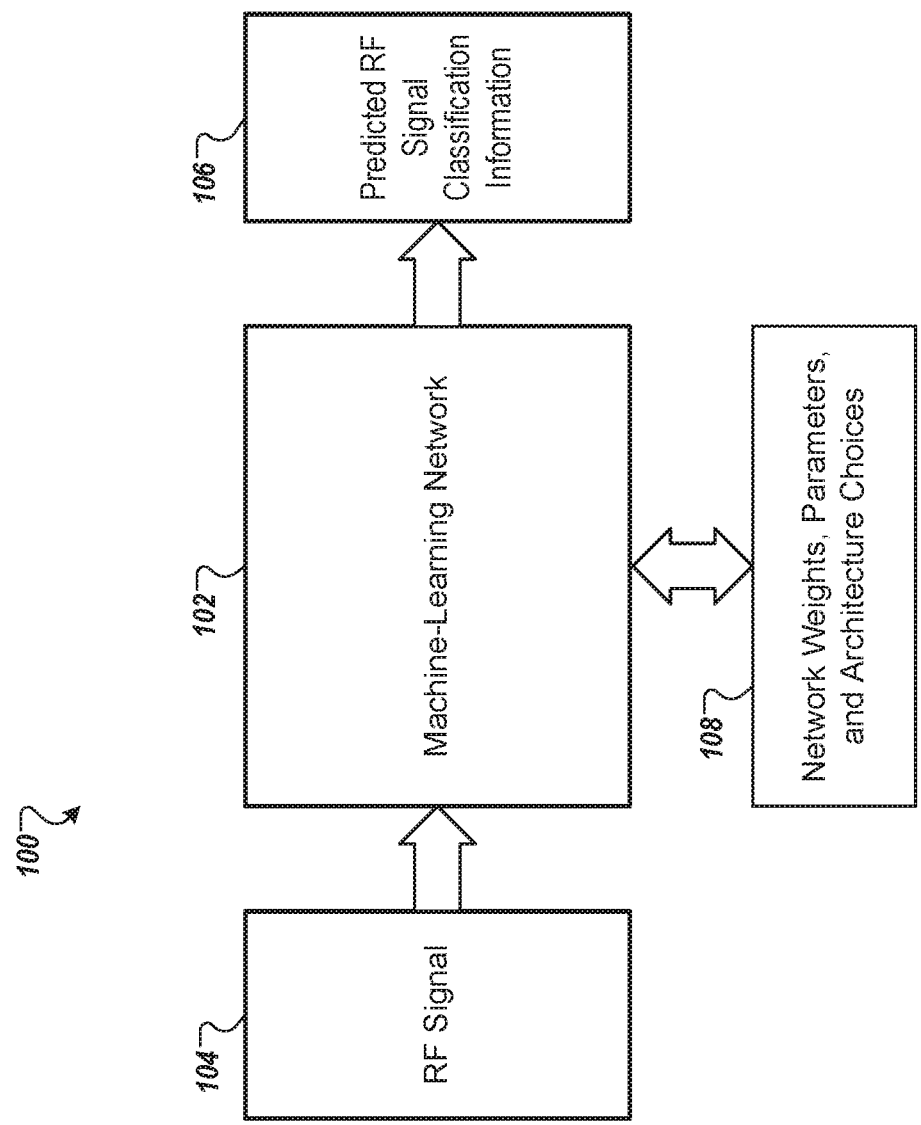
FIG. 1 illustrates an example of a radio frequency (RF) system that implements at least one machine-learning network to perform learned identification of RF signals.

Systems and techniques are disclosed herein that enable machine learning and deployment of identification of radio frequency (RF) signals. In some implementations, such systems and techniques are able to identify an RF signal and label the RF signal, which may be a series of received radio samples, with classification information regarding a characteristic of the RF signal or a characteristic of an environment in which the RF signal is communicated. Such classification information may include for example, a high-level human understandable name, a category, a radio protocol, information about the transmission method or contents that are transmitted, or a radio device name.

The machine-learning RF signal classification system may learn features to discriminate radio signal types from one another, based on raw sampled time-series radio data as well as labels for that data. The labels may be provided manually, programmatically (e.g., in scenarios where RF data and labels are generated by simulations), or through other techniques of label estimation. In some implementations, the system may combine learned features with additional expert features to form estimates of the RF signal type that is present.

A machine-learning system may be trained to learn a system for RF signal identification, for example by training on a classification model based on a large set of RF signal and labeling data. The machine-learning system may then be deployed with a fixed training model or with online model adaptation that are updated based on observations, experience, performance metrics, and/or feedback from users or higher level applications. As such, implementations disclosed herein enable quick and accurate sensing of the radio spectrum, which is a critically important task for a number of important applications.

Techniques disclosed herein may be applied to various scenarios in the field of digital radio signal processing. For example, implementations disclosed herein may enable federal regulators or operators to identify radio-signal emitter devices in licensed and unlicensed radio bands, thereby helping ensure that the signal is authorized to be emanating from an intended location or is not malfunctioning and producing unintended interference. As another example, implementations disclosed herein may enable organizations to perform quick and accurate sensing of the radio spectrum to identify hostile signals or wireless cyber-attacks more efficiently, and/or to identify and organize optimal allocation among friendly radio emitter devices.

Radio sensing techniques typically have significant power budgets and are developed using highly specialized algorithms that rely on specific analytic knowledge of the composition of certain types of target radio signals. The significant power budgets or the highly specialized nature of algorithms, or both, can severely limit the extent to which radio sensing and classification techniques are deployed and scaled to different signal types, signal environments or deployment devices in actual use. Furthermore, such algorithms may degrade under certain hardware effects or channel propagation conditions, such as when fading or intermodulation distortion is present and changes the radio signal from its ideal form.

By contrast, signal identification systems and techniques disclosed herein provide novel approaches that utilize machine learning to learn appropriate techniques for identifying RF signals, such as distinguishing between different signal types, directly from time-series RF waveforms, such as sampled radio recording of a radio transmission. In some implementations, machine learning may be performed without, or with minimal, reliance on expert feature design, such as analytic derivation of specific hand crafted features designed for specific modulations. By learning features directly from RF signals, implementations disclosed herein enable signal identification systems to adapt rapidly to different types of new signals while reducing labor-intensive and time-consuming engineering and design work to change a large number of internal algorithms in order to support a new modulation type, channel effect or other signal label.

In some scenarios, implementations disclosed herein may provide energy efficiency advantages by performing signal identification in a concurrent way, which facilitates many-core or distributed FPGA implementations. For example, systems and techniques disclosed herein may be implemented using a highly concurrent (e.g. distributed many-core or distributed logic synthesis) architecture and low clock rates (e.g., approximately 10s or 100s of MHz instead of GHz). In another example, the disclosed approach also allows for the usage of lower precision data types (e.g., 8 or 16 bit integer/float or less, instead of 32 or 64 bit floats) requiring less bits per operation to preserve the dynamic range and performance of the signal, allowing as well for lower power implementations which utilize fewer logic gates than more traditional feature-based approaches in many cases. As such, implementations disclosed herein may enable improved power efficiency of mili-Watts or singledigit Watts as compared to higher power systems which may consume tens or hundreds of Watts.

FIG. 1 illustrates an example of a radio frequency (RF) system 100 that implements at least one machine-learning network to perform learned identification of RF signals. In some implementations, the system 100 is implemented in a training scenario to train a machine-learning network 102. In other implementations, the system 100 is used in a deployment scenario to utilize a pre-trained machine-learning network 102.

As shown in FIG. 1, the system 100 includes a machine-learning network 102 that may be trained and deployed to receive an RF signal 104 and generate predicted classification information 106. In general, the machine-learning network 102 may utilize any suitable mapping of RF signals 104 to predicted RF signal classification information 106, as discussed in more detail with reference to FIGS. 2-5, below.

The predicted classification information 106 may represent various features related to the RF signal 104. For example, classification information 106 may represent a characteristic of the RF signal 104 and/or a characteristic of an environment in which the RF signal 104 is communicated. In some implementations, the classification information may include one or more labels, and may indicate deterministic or statistical classification information (e.g., likelihoods and/or probabilities). The classification information 106 may, in some implementations, include human-readable information, such as human-readable labels.

As examples, the classification information may indicate characteristics of the RF signal and/or the environment of the RF signals, such as a modulation type of RF signals (e.g. QPSK, BPSK, OOK, FSK, GMSK, OFDM, etc.); a type of protocol or standard that is carried on or that is utilized to transmit RF signals (e.g., GSM, LTE, Wi-Fi 802.11g, LTE-5 MHz-TDD, HSPA, P25, etc.); a specific radio device utilized to transmit or receive RF signals, a tower or user associated with RF signals. As another example, the classification information may indicate a type of traffic, behavior or other contents that are being carried by the RF signal, such as normal usage on a wireless channel, types of application data, or nefarious attacks on the wireless channel (e.g., flooding, probing or jamming attacks). In these cases, detection of such events may result in triggering an alarm, triggering a configuration change in an electronic device such as a router or firewall, reconfiguration of a wireless system, or otherwise.

As further examples, the classification information may indicate a type of RF emission or a type of RF emission pattern (e.g., a particular sequence of data bits or other pattern in the RF emission that can be distinguished and identified) occurring, which may indicate electromagnetic interference (EMI), malicious interference (e.g., snooping), or a noise source (e.g., communication channel noise or hardware noise). The type of RF emission or RF emission pattern may be utilized to determine specific events of interest, such as equipment malfunction (e.g., a broken cable or connector on a base station generating impedance mismatch/inter-modulations/distortions, or a heater or electronic device emitting harmful EMI). As such, implementations disclosed herein may be utilized to identify EMI emitter types and/or identify wireless changes, failures, interferers, threats or anomalies (e.g., cyber-threats, attacks).

In yet another example, the classification information may indicate a presence of particular types of communication signals. For example, the classification may involve a binary decision indicating whether a particular type of RF signal is present, therefore enabling an RF signal detection technique. In this instance one or more of the signal labels may indicate the presence of background noise, or the absence of a known signal type or label. In some examples information derived from the RF signal may be used to perform analytics on emitters (e.g., passing people, vehicles, devices, etc.) which may include detection, on-times, usage level, location, or other statistical information about their use.

In a training scenario, the machine-learning network 102 takes an input RF signal 104 and learns how to generate predicted RF signal classification information 106 that corresponds to the signal 104. During training, various network features 108 of the machine-learning network 102 may be updated to achieve a desired performance objective, such as weights of one or more network layers, parameters, or architecture choices for the machine-learning network 102.

In some implementations, training may involve comparing the predicted RF signal classification information 106 with known or pre-labeled classification information, to determine a classification error for input signal 104. The machine-learning network 102 may be trained to achieve various types of objective functions, which may involve a measure of classification error, a measure of computational complexity (e.g., as measured by the number of parameters, number of multiplies/adds, execution time, Kolmogorov complexity, etc.), or combinations thereof. Further details of training are described below, for example with reference to FIGS. 4 and 5.

Once trained, the machine-learning network 102 may be deployed in various application scenarios to perform learned identification of RF signals, using the identification techniques that were learned during training. In some implementations, the machine-learning network 102 may be further updated during deployment based on real-time performance results of identification. Further details of deployment are described below, for example with reference to FIGS. 6 and 7.

In some implementations, the input RF signal 104 may represent the result of an analog RF waveform that was received by one or more antennas over a medium, such as over the air. The RF signal 104 may be processed by the machine-learning network 102 in analog or digital form. For example, the RF signal 104 may represent a digitized representation, such as a raw sampled time series, of an RF waveform that was received and processed by a receiver before being input into the machine-learning network 102. In some implementations, the RF signal 104 may be an analog waveform, and the machine-learning network 102 may implement various filters, samplers, analog-to-digital (A/D) converters, or other circuitry and modules for processing the RF signal 104. In some scenarios, the input RF signal 104 may be a composite signal that includes multiple RF signals, one or more of which may be distinguished and identified by the machine-learning network 102.

In some implementations, the machine-learning network 102 may include at least one artificial neural network that consists of one or more connected layers of parametric multiplications, divisions, additions, and non-linearities, or other operations (e.g., normalization). In such scenarios, updating the machine-learning network 102, which may occur during training or deployment, includes updating weights of the neural network layers, or updating connectivity in the neural network layers, or other modifications of the neural network architecture, so as to modify a mapping of inputs to outputs.

The machine-learning network 102 may be configured to identify RF signals using any suitable machine-learning technique. For example, the machine-learning network 102 may implement a mapping from RF signal inputs 104 into a lower-dimension space, from which the predicted RF signal classification information 106 is generated. As an example, the lower-dimensional mappings may be utilize a set of basis functions and transforming the input RF signal 104 into a lower-dimensional projection of the signal 104 onto those basis functions. The predicted RF signals classification information 106 may then be generated based on analyzing those projections onto the basis functions.

RF signals that are processed by system 100 may include any suitable radio-frequency signal, such as acoustic signals, optical signals, or other analog waveforms, typically of human-designed communications system or radar/sonar system. In some instances, the signals may have been designed by automated processes (e.g., learned communications or radar systems). The spectrum of RF signals that are processed by system 100 may be in a range of 1 kHz to 300 GHz. For example, such RF signals include very low frequency (VLF) RF signals between 1 kHz to 30 kHz, low frequency (LF) RF signals between 30 kHz to 300 kHz, medium frequency (MF) RF signals between 300 kHz to 1 MHz, high frequency (HF) RF signals between 1 MHz to 30 MHz, and higher-frequency RF signals up to 300 GHz.

The RF signals may themselves be information, such as measurements that are output from sensors or probes, including medical devices and equipment monitoring devices. Alternatively, the RF signals may be fixed waveforms that have been modulated to carry other information, such as carrier waveforms modulated by a communication system to carry data. In both scenarios, implementations disclosed herein enable learning identification of RF signals, and provide efficient classification, analysis, and high-level understanding of those signals.

Figure 2:
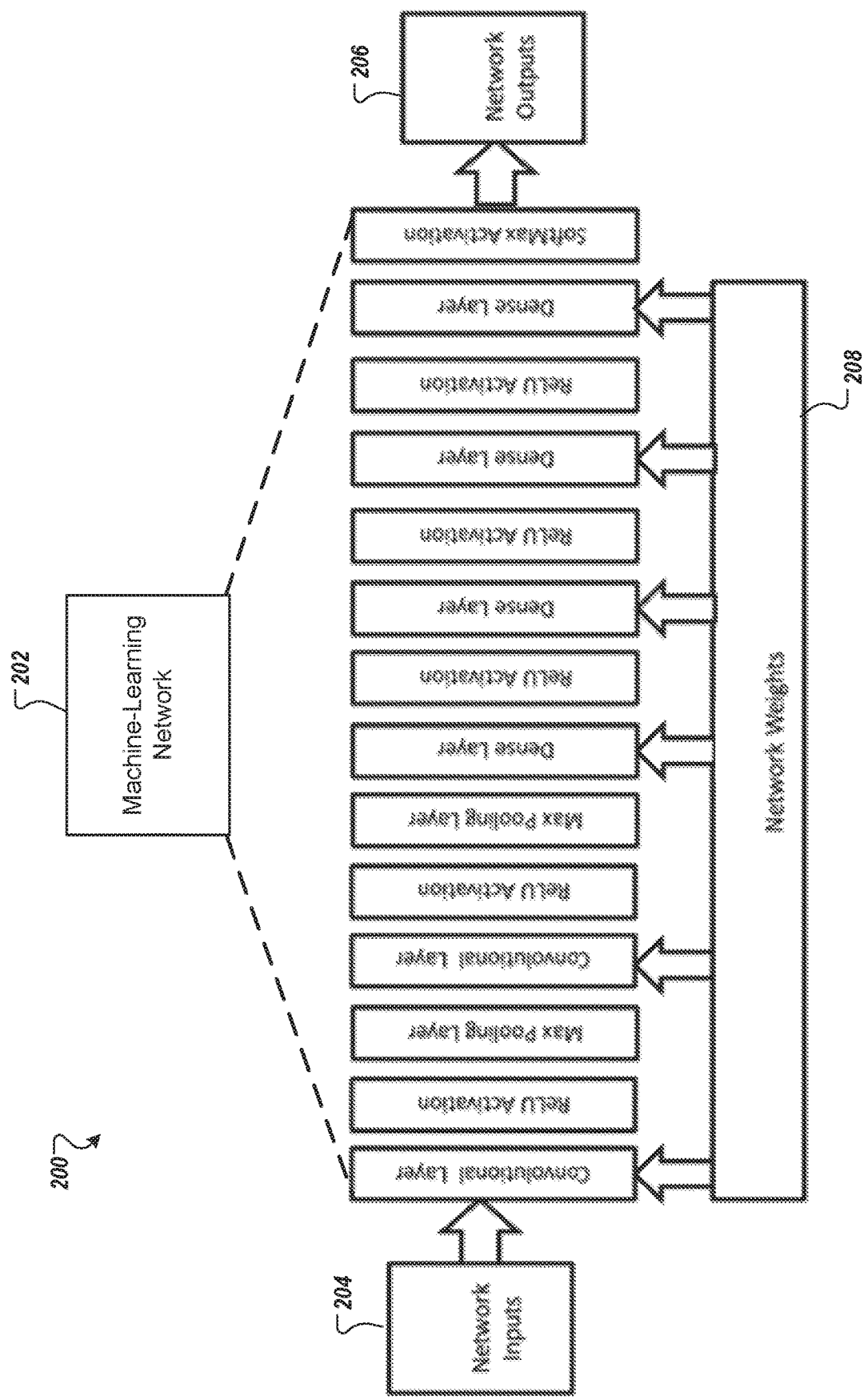
FIG. 2 illustrates an example of a structure of an RF system implementing at least one machine-learning network to perform learned identification of RF signals.

FIG. 2 illustrates an example of a network structure 200 of an RF system implementing at least one machine-learning network to perform learned identification of RF signals. The network structure 200 includes machine-learning network 202 that is implemented using an artificial neural network that consists of one or more layers. The output of each network layer is used as input to the next network layer. Each layer of the network generates an output from a received input in accordance with current values of a respective set of parameters.

The machine-learning network 202 may include one or more such layers that are shown. For example, in some implementations, the machine-learning network 202 may include a plurality of networks that may be collectively or iteratively trained. As such, the network input 204 in FIG. 2 may be the original received RF signal (e.g., RF signal 104 in FIG. 1, above), or may be an output of one or more layers in the machine-learning network 202. Analogously, the network output 206 may represent the final predicted classification information (e.g., classification information 106 in FIG. 1, above), or may be an input into one or more subsequent layers in the machine-learning network 202.

In general, the machine-learning network 202 may include one or more collections of multiplications, divisions, and summations of inputs and intermediate values, optionally followed by non-linearities (such as rectified linear units, sigmoid function, or otherwise) or other operations (e.g. normalization), which may be arranged in a feed-forward manner, including optional bypass or residual connections or in a manner with feedback and in-layer connections (e.g., a recurrent or quasi-recurrent network). Parameters and weight values in the network may be used for a single multiplication, as in a fully connected neural network (DNN), or they may be "tied" or replicated across multiple locations within the network to form one or more receptive fields, such as in a convolutional neural network, a dilated convolutional neural network, a residual network unit, or similar. A collection of one or more of these layers may constitute the machine-learning network 202. The specific structure for the networks may be explicitly specified at design time, or it may be selected from a plurality of possible architecture candidates to ascertain the best performing candidate.

The machine-learning network 202 may implement dense network layers and/or convolutional network layers, and non-linear activations. In the example of FIG. 2, the machine-learning network 202 implements convolutional neural network (CNN) layers and dense neural network (DNN) layers with rectified linear-unit (ReLU) and Soft-MAX activations In general, however, implementations are not limited to these specific types of layers, and other configurations of layers and non-linearities may be used, such as sigmoid, tan h, and others. One common configuration may include a sequence of convolutional layers, utilizing pooling or striding, resulting in a set of feature maps which are combined using a fully connected layer to produce classification information.

One or more layers of the machine-learning network 202 (e.g., dense, convolutional, or otherwise), may include a set of parameters, such as weights 208 for the network layers. The machine-learning network 202 adapts these layers, including connectivity between layers and parameter such as network layer weights, to learn techniques for generating a network output 206 in response to a network input 204.

The network weights 208 may be real or complex valued numbers such as floating point values, fixed point numbers, or integer numbers which are used by multiplication or addition operations within the model architecture of machine-learning network 202 to be combined with the input RF signal (e.g., network input 204), or intermediate values within the model.

The convolutional layers in the machine-learning network 202 may facilitate time-shift invariance learning, and may reduce the number of parameters used to classify the input RF signal (e.g., network input 204). For example, by using convolutional layers with only one or two filters, implementations disclosed herein may achieve a maximally matched small set of time-basis filters. As such, convolutional layers may be well suited for reducing parameter space and forming a compact front-end for radio data. Learned weights can be extremely useful in the analysis or reception of unknown or partially known signal types, for instance filters can often learn the modulation basis functions or pulse shapes used within a transmission system very quickly which can be used to aid the reception or analysis of an unknown system type.

In addition to the convolutional layers, dense layers with non-linear activations may be implemented in between these convolutional layers to provide an estimation of the logic for what the classification should be for those basis filters occurring at different times. For example, non-linearities or activation functions may be applied to an intermediate layer summation (t) and produce an intermediate layer or final layer output (s). Example include a sigmoid function given by $S(t)=1/(1+e^{-t})$; a rectifier (or rectified linear units, ReLU) given by $S(t)=\max(0, t)$; a hyperbolic tangent ("tan h") given by $S(t)=(e^t-e^{-t})/(e^t+e^{-t})$, a Softmax function given by $S(t)=e^{jt}/\Sigma_j e^{jt}$; or another function providing a similar non-linear effect.

In some implementations, the machine-learning network 202 may include at least one regularization layer having at least one of weight regularization on convolutional network layer weights, activity regularization on dense network layer activations, or other stochastic impairments on activations or weights, such as dropout or dropconnect. For example, regularization may be used to prevent over-fitting. Dropout, such as a penalty on the convolutional layer weights, may be utilized to encourage minimum energy bases, and a penalty on the first dense layer activation may be utilized to encourage sparsity of solutions.

In training scenarios, various features of the machine-learning network 202 may be updated to learn a classification technique. For example, if an artificial neural network is implemented in the machine-learning network 202, then the specific arrangement and composition of artificial neural network layers, types of layers, and parameterizations such as weights in the layers may be updated based on the specific dataset or training process. As such, the machine-learning network 202 may be trained based on different configurations of input values, network layer weights, multiplications of weights with inputs, summations of these scaled weights, and the generation of output activations from these summations. In the case of dense network layers, every input to output combination may have a unique weight scaling, while in the case of convolutional or other types of network layers, weights may be re-used at different shifts or patterns across many input activations.

Various different configurations of CNN, DNN, activation, or some combination of these layers which may be sequential, parallel, or connected with various bypass or cross connections and other network layer types may be used in the machine-learning network 202 to achieve a desired objective function. Any suitable search process, such as greedy search, guided search, or evolution, may be used to assist in classification model selection during training scenarios.

A general design objective for the machine-learning network 202 may be to obtain a minimum complexity network, while still achieving desired classification performance.

Figure 3:
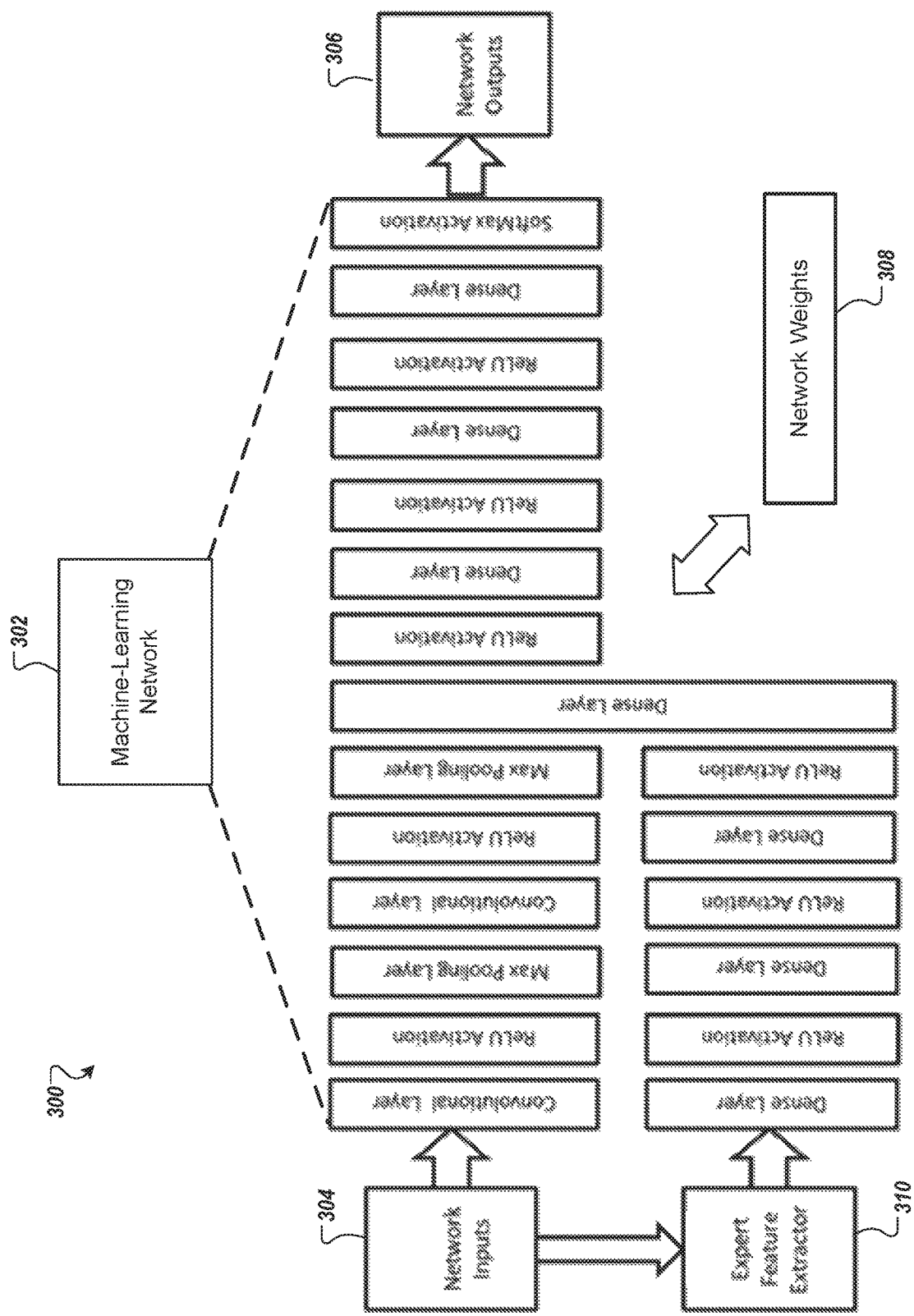
FIG. 3 illustrates an example of a structure of an RF system implementing at least one machine-learning network to learn and merge raw time-series RF signal information with features that are extracted from the RF signal to perform learned identification of RF signals.

FIG. 3 illustrates an example of a network structure 300 of an RF system implementing at least one machine-learning network to learn and merge raw time-series RF signal information with features that are extracted from the RF signal to perform learned identification RF signals. The network structure 300 includes a machine-learning network 302 implementing an artificial neural network including one or more layers to learn RF signal classification information (e.g., network output 306) from an input RF signal (e.g., network input 304), utilizing one or more network layer weights 308, as in the example described in FIG. 2, above.

Compared to the example of FIG. 2, however, the example of FIG. 3 additionally utilizes a feature extractor 310 that leverages prior knowledge about the RF signal (e.g., network input 304). The feature extractor 310 may utilize, for example, features and/or transforms that are obtained from expert hand crafted techniques or automated feature-extracting techniques. Therefore, the structure 300 in FIG. 3 enables using both machine-learned information and extracted features from RF signals to generate the network output 306 (which may be the RF signal classification information or an input to another one or more layers, as discussed in regards to FIG. 2, above).

The features extracted by feature extractor 310 may, in some implementations, thus be included as additional inputs to the machine-learning network 302. In some scenarios, this may provide a more accurate classification as compared to using machine learning alone. For example, if an artificial neural network is implemented in the machine-learning network 302, then the specific arrangement and composition of artificial neural network layers, types of layers, and parameterizations such as weights in the layers may be updated based on the specific dataset, extracted features or labels, or training process. One example where this may improve performance is when a smaller amount of training data is available, and a small machine learning network is used (e.g., to avoid over-fitting or poor generalization of the network).

In some implementations, the feature extractor 310 may also be trained, as with the machine-learning network 302, based on results of classification performance.

Figure 4:
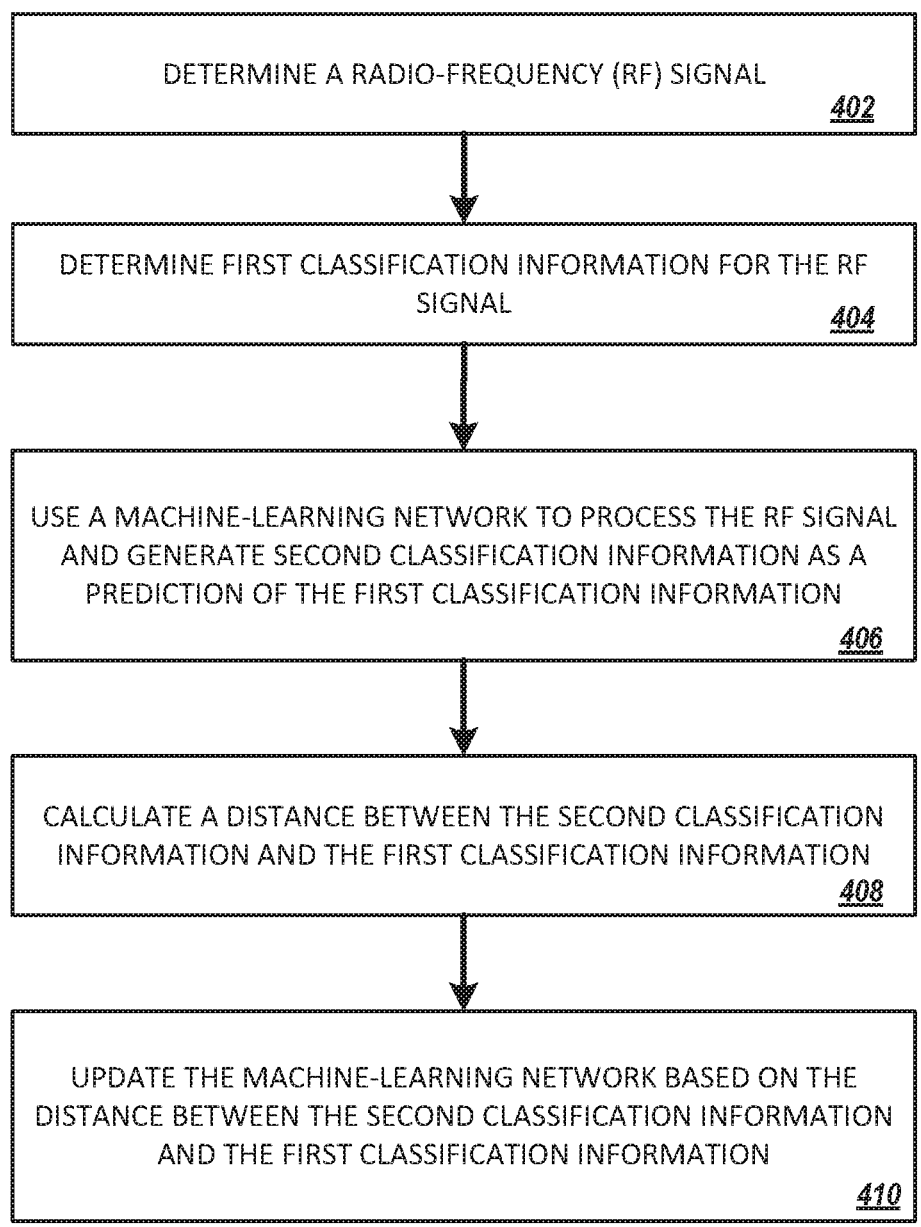
FIG. 4 is a flowchart illustrating an example method of training at least one machine-learning network to perform learned identification of RF signals.

FIG. 4 is a flowchart illustrating an example method 400 of training at least one machine-learning network to perform learned identification of RF signals. This type of training may be utilized to train a machine-learning network (e.g., machine learning network 102 in FIG. 1, above) to classify RF signals. The method 400 may be performed by one or more processors, such as one or more CPUs, GPUs, DSPs, FPGAs, ASICs, TPUs, neuromorphic chips, or vector accelerators that execute instructions encoded on a computer storage medium.

The example training method 400 includes determining an RF signal that is configured to be transmitted through an RF band of a communication medium (402). The RF signal (e.g., RF signal 104 in FIG. 1, above) may be generated from a training dataset of sample RF signals, and may be in digital or analog form. In some implementations, the RF signals in the training dataset may have been obtained from an RF waveform that was received by one or more antennas, or may have been obtained by other techniques, such as simulation, as further discussed in regards to FIG. 5, below.

The method 400 further includes determining first classification information that is associated with the RF signal (404). The first classification information may be, for example, one or more labels that are known to be associated with the RF signal, and that are used as reference points for evaluating the performance of the machine-learning network during training. The first classification information may include a representation of at least one of a characteristic of the RF signal or a characteristic of an environment in which the RF signal is communicated. As examples, the first classification may be pre-stored label information (e.g., stored label information 526 in FIG. 5, below), and/or may include human labeling and/or machine labeling (e.g., 512 and/or 514 in FIG. 5, below).

The method 400 further includes using at least one machine-learning network to process the RF signal and generate second classification information, which is a prediction of the first classification information (406). In some implementations, the machine-learning network (e.g., machine learning network 102 in FIG. 1, above) is an artificial neural network that may utilize any suitable mapping from input RF signals (e.g., RF signal 104 in FIG. 1, above) to predicted second classification information (e.g., predicted classification information 106 in FIG. 1, above). The second classification information may include a representation of at least one of a characteristic of the RF signal or a characteristic of an environment in which the RF signal is communicated. Details of this classification process are discussed further in regards to FIG. 5, below.

The method 400 further includes computing a measure of distance between (i) the second classification information that was generated by the machine-learning network, and (ii) the first classification information that was associated with the RF signal (408). This measure of distance may be implemented as a loss function (e.g., loss function 510 in FIG. 5, below) and represents a difference or error between the second classification information and the first classification information. As examples, the measure of distance may include cross-entropy, mean squared error, or other geometric distance metric (e.g., MSE, MAE, KL divergence), or may combine several geometric, entropy-based and/or other classes of distance metrics into an aggregate expression for distance or loss, as discussed further in regards to FIG. 5, below. In some instances, for example where cross-entropy and a SoftMax or hierarchical SoftMax output activation are used during training, the network may output pseudo-probabilities of the presence of each class, in cases such as these the pseudo-probabilities, or ratios between pseudo-probabilities may be used to form a likelihood or other confidence metric.

The method 400 further includes updating the at least one machine-learning network based on the measure of distance between the second classification information and the first classification information (410). This updating may generally include updating any suitable machine-learning network feature, such as network weights, architecture choice, machine-learning model, or other parameter or connectivity design, as further discussed in regards to FIG. 5, below.

Figure 5:
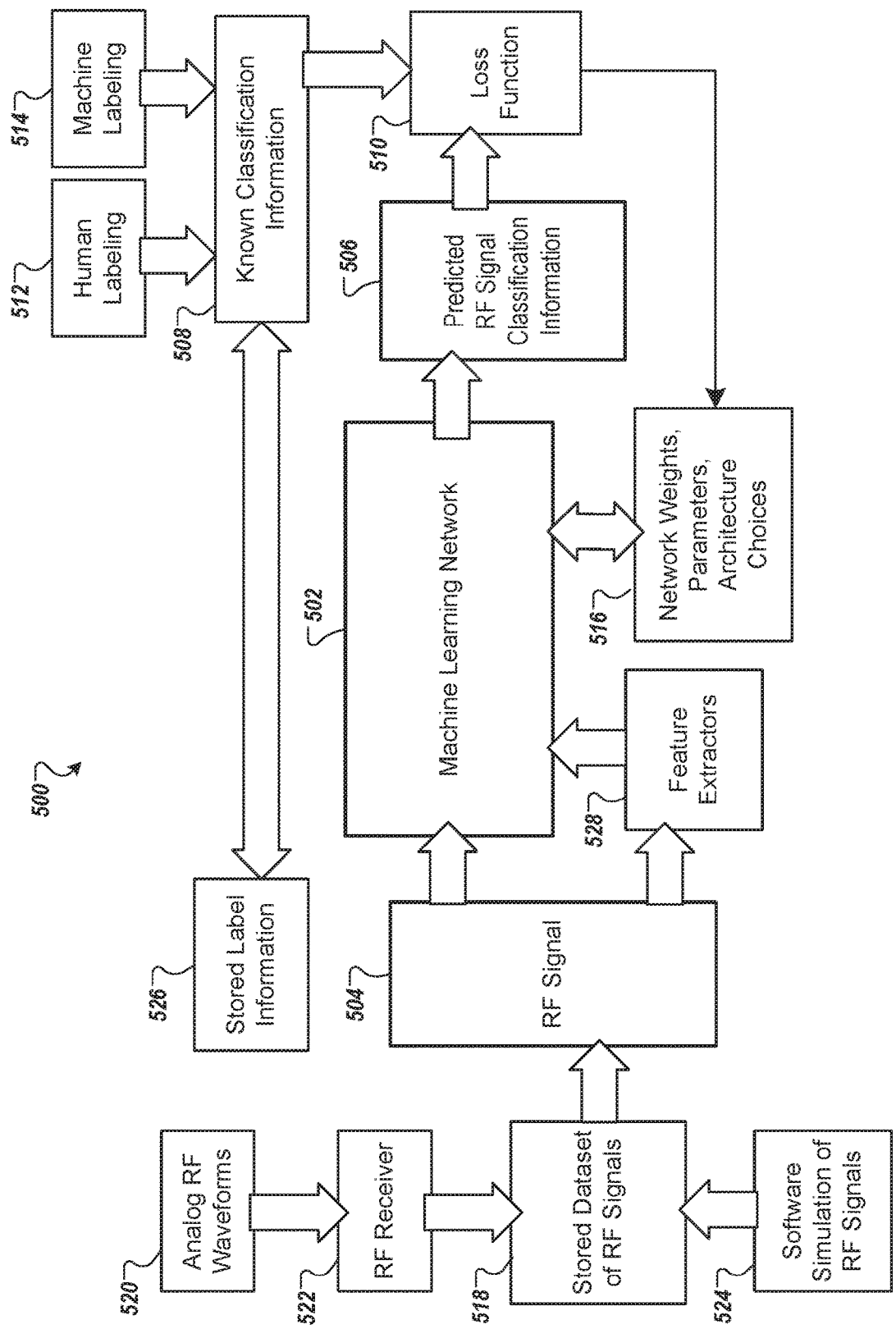
FIG. 5 illustrates an example system of training an RF system that implements at least one machine-learning network to perform learned identification of RF signals.

FIG. 5 illustrates an example system 500 of a training an RF system that implements at least one machine-learning network to learn how to identify RF signals. The system 500 includes a machine-learning network 502 that is trained to learn how to classify input RF signals 504 into predicted RF signal classification information 506.

During training, the machine-learning network 502 takes an RF signal 504 as input and generates predicted RF signal classification information 506, subject to constraints or other objectives. In general, the machine-learning network 502 may be configured to utilize any suitable mapping from the input RF signal 504 to generate the output predicted RF signal classification information 506, examples of which are described further below. For example, in some implementations, the machine-learning network 502 may convert the RF signal 504 as raw time-domain samples or features into information (such as one or more likelihoods or probabilities) enabling the prediction of RF signal classification (such as class labels).

The system 500 then compares the resulting predicted RF signal classification information 506 with known classification information 508, to compute a loss function 510 between the predicted and known classifications. The known classification information 508 may be obtained by various techniques, such as human labeling 512 and/or machine labeling 514 of the RF signal 504. Alternatively or additionally, the known classification information 508 may include stored label information 526 that is associated with the RF signal 504, which is discussed further below.

In general, classification information, such as the predicted classification information 506 and the known classification information 508, may represent various features related to an RF signal. For example, classification information may represent a characteristic of the RF signal 504 and/or a characteristic of an environment in which the RF signal 504 is communicated. The classification information may, in some implementations, include human-readable information, such as human-readable labels.

As examples, the classification information may indicate a modulation type of RF signals (e.g. QPSK, BPSK, OOK, FSK, GMSK, OFDM, etc.); a type of protocol or standard that is carried on or that is utilized to transmit RF signals (e.g., GSM, LTE, Wi-Fi 802.11g, LTE-5 MHz-TDD, HSPA, P25, etc.); a specific radio device utilized to transmit or receive RF signals, a tower or user associated with RF signals. As another example, the classification information may indicate a type of traffic, behaviors, or contents being carried by the RF signal, such as normal usage on a wireless channel, or nefarious attacks on the wireless channel (e.g., flooding attacks).

As further examples, the classification information may indicate a type of RF emission or a type of RF emission pattern (e.g., a particular sequence of data bits occurring, which may indicate electromagnetic interference (EMI), malicious interference (e.g., snooping), or a noise source (e.g., communication channel noise or hardware noise). The type of RF emission or RF emission pattern may be utilized to determine specific events of interest, such as equipment malfunction (e.g., a broken cable on a base station generating impedance mismatch/inter-modulations, or a heater or electronic device emitting harmful EMI). As such, implementations disclosed herein may be utilized to identify EMI emitter types and/or identify wireless threats or anomalies (e.g. cyber-threats, attacks).

In yet another example, the classification information may indicate a presence of particular types of communication signals. For example, the classification may involve a binary decision indicating whether a particular type of RF signal is present, therefore enabling an RF signal detection technique.

The loss function 510 may be any suitable measure of distance between the two classifications. For example, the loss function 510 may indicate a cross-entropy, mean squared error, or other geometric distance metric (e.g., MSE, MAE, KL divergence) between the predicted classification information 506 and the known classification information 508. In some implementations, the loss function 510 may combine several geometric and/or entropy-based distance metrics into an aggregate expression for distance.

The update process 516 may utilize the computed loss function 510 to update the machine-learning network 502. In general, the update process 516 may perform updates based on the loss function 510, as well as other performance metrics, such as network complexity of the machine-learning network 502, or computational power or throughput. Other performance metrics may include a computational throughput or delay (e.g., time duration or operation count) achieved by the at least one machine-learning network in classifying RF signals, a computational dwell time associated with the at least one machine-learning network in classifying RF signals, or a computational duty cycle associated with the at least one machine-learning network in classifying RF signals. In some implementations, the update process 516 may additionally or alternatively include one or more hard constraints on such metrics.

The update process 516 may utilize various techniques to determine a suitable update of the machine-learning network 502, such as an optimization method including evolution, gradient descent, stochastic gradient descent, or other solution techniques. In some implementations, the update process 516 may include user preferences or application specifications.

As an example, the update process 516 may seek to optimize (or nearly optimize) an objective function that combines one or more performance metrics, such as classification error or complexity, discussed above. In some implementations, the objective function may be a weighted combination of such metrics.

The update process 516 may calculate a rate of change of the objective function relative to variations in the machine-learning network 502, for example by calculating or approximating a gradient of the objective function. Such variations may include, for example, variations in network layer weights or other network parameters, as discussed further below. The variation may be determined based on a desired change in the objective function, for example, using Stochastic Gradient Descent (SGD) style optimizers, such as Adam, AdaGrad, Nesterov SGD, or others. In some implementations, these variations may be determined using other scalable methods for direct search, such as evolutionary algorithms or particle swarm optimizations.

Once the variations have been determined, the update process 516 then applies those variations to update the machine-learning network 502. For example, the update process 516 may update at least one network weight in one or more layers of the machine-learning network 502. In general, updating the machine-learning network 502 is not limited to updating network weights, and other types of updates may be implemented, such as layer parameters, additions, multiplications, applications of activation functions, and other tunable algorithm specific features of the machine-learning network 502. In some implementations, updating the machine-learning network 502 may include selecting a machine-learning model from among a plurality of models. In such implementations, selecting machine-learning models may include selecting a specific network architecture, such as choice of layers, layer-hyperparameters, or other network features.

The input RF signal 504 may be generated from a set of example RF signals in a training dataset 518. The training dataset 518 may be generated by various techniques. For example, the training dataset 518 may be generated from a set of analog RF waveforms 520 that have been processed by an RF receiver 522. The RF receiver 522 may perform sampling, filtering, and/or analog to digital (A/D) conversion of the analog RF waveforms 520, to form a set of sampled time-series radio signal examples in the dataset 518. Alternatively, or additionally, the training dataset 518 may be generated through simulation, such as software simulation of RF signals 524. In general, the training dataset 518 consists of a large number of recordings or simulations of RF signal examples, in time or in another representation.

In some implementations, one or more RF signals from the training dataset 518 may be augmented to include additional effects, for example to model real-world phenomena or variations in signaling (e.g., hardware imperfections, wireless propagation, or other variations). For example, the particular RF signal 504 may be stored and labeled (e.g., with stored label information 526) in the training dataset 518. During training, when the RF signal 504 is processed by the machine-learning network 502, one or more additional effects may be introduced in the RF signal 504 to broaden the types or number of examples of signals that are modelled by the RF signal 504. For example, the system may introduce random phase/frequency offsets, time offsets, time dilations, delay spreads, fading effects, distortion effects, interference effects, spatial propagation effects, dispersion effects, differing contents, non-linear effects, noise, and/or other signal effects in the RF signal. Such effects may be implemented, for example, as regularization layers in the machine-learning network 502 or as other augmentation effects while training or while pre-processing the input data prior to training. As such, the training may be made more robust (e.g., to generalize well) to identify not only the particular RF signal 504, but also to identify a range of RF signals that correspond to the RF signal 504 having been affected or perturbed by real-world variability (e.g., through a plurality of different propagation modes or differing channel state information).

The training dataset 518 may include a same type or different types of example RF signals. Depending on the composition of RF signals in the training dataset 518, the machine-learning network 502 may learn to identify a certain type of radio signal or a wide range of different types of radio signals. For example, the training dataset 518 may be limited to a particular class of RF signals. In such scenarios, the machine-learning network 502 will be trained to learn predicted RF signal classification information 506 that are tuned to that particular class of RF signals. By training on different classes of RF signals, the machine-learning network 502 may learn to classify different classes of RF signals.

In some implementations, the machine-learning network 502 may determine an appropriate time-scale over which to process RF signals in the training dataset 518. For example, the machine-learning network 502 may initially process the RF signal over a first time scale, and may then subsequently update the processing to a second time scale based on classification performance. By updating the duration over which identification is performed, the machine-learning system 502 is able to learn an appropriate time scale to identify the RF signal more accurately, thus taking into account time-variant characteristics of RF signals.

As an example, if classification error (e.g., the measure of distance between predicted and known classification information) does not satisfy threshold criteria, then the machine-learning network 502 may lengthen the time scale over which identification is performed, or combine the results of multiple classifications to obtain better accuracy over more samples of the input RF signal. As another example, if computational complexity or power does not satisfy threshold criteria, then the machine-learning network 502 may shorten the time scale over which identification is performed, to reduce computational burden.

In some implementations, the example RF signals in the training dataset 518 may be associated with stored label information 526. The stored label information 526 may include labels that are stored for one or more RF signals in the training dataset 518. In general, the stored label information 526 may include labels that represent various types of information regarding the RF signals in the training dataset 518, as discussed regarding classification information, above In some implementations, the system 500 may implement a feature extraction process 528 that extracts additional statistics or features from the input RF signal 504. In some implementations, the feature extraction process 528 may leverage expert information about the structure of a modulation of the RF signal 504. For example, the feature extraction process 528 may leverage parameters such as higher-order-moments, or other integrated statistics about the input RF signal 504, or in other instances it may perform steps such as synchronization or multi-carrier extraction prior to classification. Such features may then be utilized with the machine-learning network 502 to form an expert-augmented machine-learning model which can be trained, as previously described. In some implementations, the feature extractor 310 may also be trained based on classification performance, such as based on the measure of distance between the predicted classification 506 and known classification 508.

In some implementations, the machine-learning network 502 may process the input RF signal 504 using a set of basis functions. For example, the machine-learning network 502 may process the input RF signal 504 and compute projections onto the basis functions to determine basis coefficients that represent the input RF signal 504. Using these basis coefficients, or using further transformations thereof, the machine-learning network 502 may determine appropriate RF signal classification information 506, for example using clustering algorithms or other suitable classification algorithms.

The basis functions may be any suitable set of orthogonal or non-orthogonal set of basis functions that can represent the RF signal 504. For example, the basis functions may be In-Phase and Quadrature-Phase (I/Q) signals, Fourier basis functions, polynomial basis functions, Gaussian basis functions, exponential basis functions, wavelet basis functions, or combinations of these and/or other suitable set of basis functions that can be utilized represent RF signals. The basis functions may have different phase, amplitude, and/or frequency components.

The machine-learning network may then project the input RF signal 504 onto the set of basis signals to determine basis coefficients. As a specific example, if the basis functions are Fourier basis functions, then the machine-learning network 502 may implement a bank of filters each tuned to a particular frequency, and may process the RF signal 504 by correlating the RF signal 504 with the filters to generate a set of basis coefficients. In some implementations, the basis functions may be parameterized and the training may involve optimizing over parameters of the basis functions.

The training of the machine-learning network 502 may begin with any suitable set of initial conditions. For example, the training may begin with a random set of basis functions subject to certain conditions. Alternatively, the training may begin with a fixed set of basis functions, such as commonly used RF communication basis functions including Quadrature Phase-Shift Keying (QPSK) or Gaussian Binary Frequency Shift Keying (GFSK), orthogonal frequency division multiple access (OFDM), or other fixed set of basis functions. In other instances, the training may begin with a set of initial conditions which has been learned in the training process for another set of data (e.g., similar signals, or different set of examples of the same signals).

During training, the machine-learning network 502 may attempt to learn improved basis functions, according to the results of the predicted RF classification information 506. In such scenarios, training the machine-learning network 502 may involve optimizing over a set of basis functions or over different sets of basis functions, for example using greedy search or other optimization-type algorithm. However, implementations are not limited to using basis functions, and the machine-learning network 502 may perform any suitable processing of the input RF signal 504 to predict the RF signal classification information 506.

Upon achieving a desired objective during training, a particular choice of model architecture, network weights, and training parameters are selected and stored to represent the model that will be implemented in a deployed system.

Figure 6:
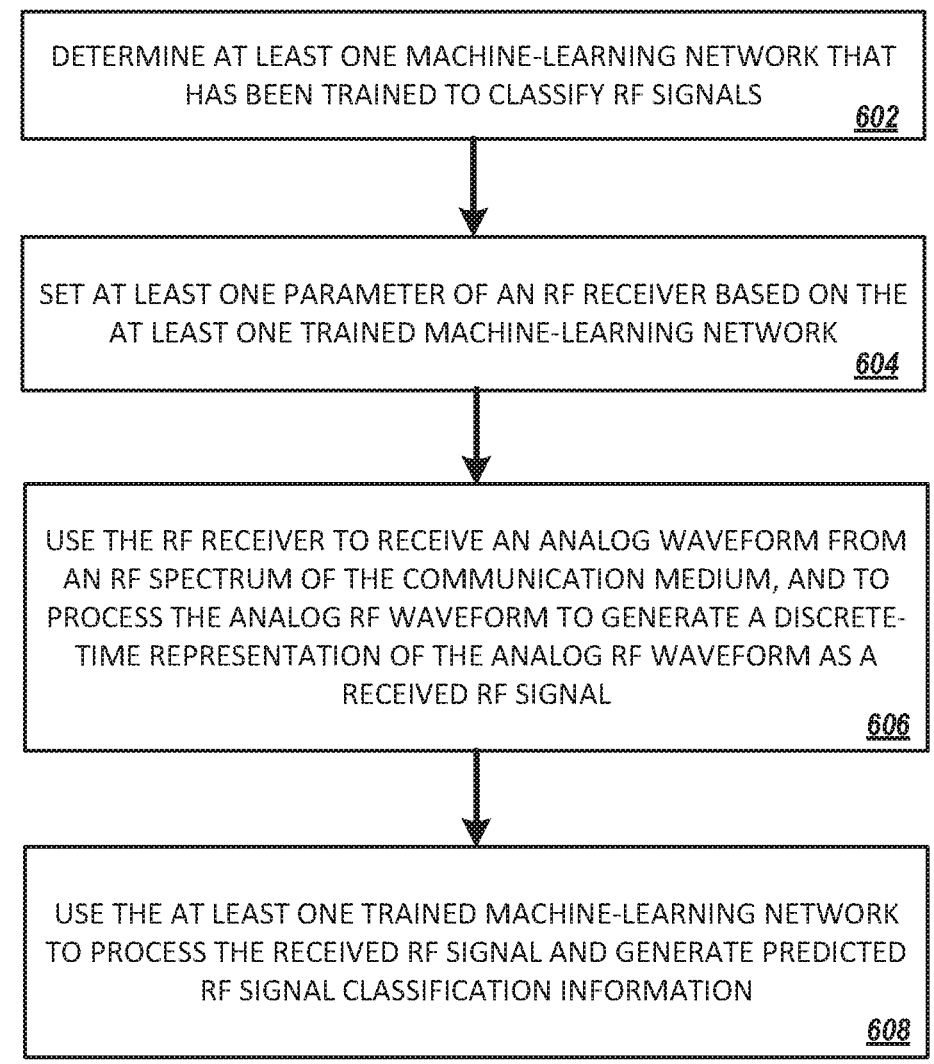
FIG. 6 is a flowchart illustrating an example system of deploying an RF system implementing at least one machine-learning network that has been trained to perform learned identification of RF signals.

FIG. 6 is a flowchart illustrating an example method 600 of deploying an RF system implementing at least one machine-learning network that has been trained to perform learned identification of RF signals. Such deployment may utilize at least one machine-learning network (e.g., machine-learning network 502 in FIG. 5, above) that has been previously trained, for example by using a training technique as shown in FIG. 4, above, or similar training techniques. In some implementations, the machine-learning network may be an artificial neural network, as discussed above, that has been trained to learn a set of network features (e.g., network layer weights, parameters, and/or network architectures) to achieve a performance-related objective.

The method 600 includes determining at least one machine-learning network has been trained to classify RF signals configured to be transmitted through an RF band of a communication medium (602). For example, at least one trained machine-learning network may have been previously trained using a training technique as shown in FIG. 4, above, or similar training techniques.

The method 600 further includes setting at least one parameter of an RF receiver based on the at least one trained machine-learning network or based on updates to the machine-learning network during deployment (604). The RF receiver and its parameter settings may be implemented, for example, similar to RF receiver 716 in FIG. 7, below.

The method 600 further includes using the RF receiver to receive an analog RF waveform from an RF spectrum of the communication medium, and to process the analog RF waveform to generate a discrete-time representation of the analog RF waveform as a received RF signal (606). For example, the RF receiver may include one or more antennas to receive an analog RF waveform over the air (or other medium), and may process the analog RF waveform to generate an RF signal (e.g., RF signal 504 in FIG. 5, above) that is to be classified.

The method 600 further includes using the at least one trained machine-learning network to process the received RF signal and generate predicted RF signal classification information (608). The predicted RF signal classification information (e.g., predicted classification information 106 in FIG. 1 or 506 in FIG. 5, above) may include a representation of at least one of a characteristic of the received RF signal or a characteristic of an environment in which the received RF signal was communicated.

The RF signal classification information may be stored in memory, or transmitted to another automated system over some communications bus. In some implementations, the RF signal classification information may be displayed to a user directly or as an annotation on top of a displayed visualization of the received RF signal (e.g., as a spectrogram or power spectral density).

Figure 7:
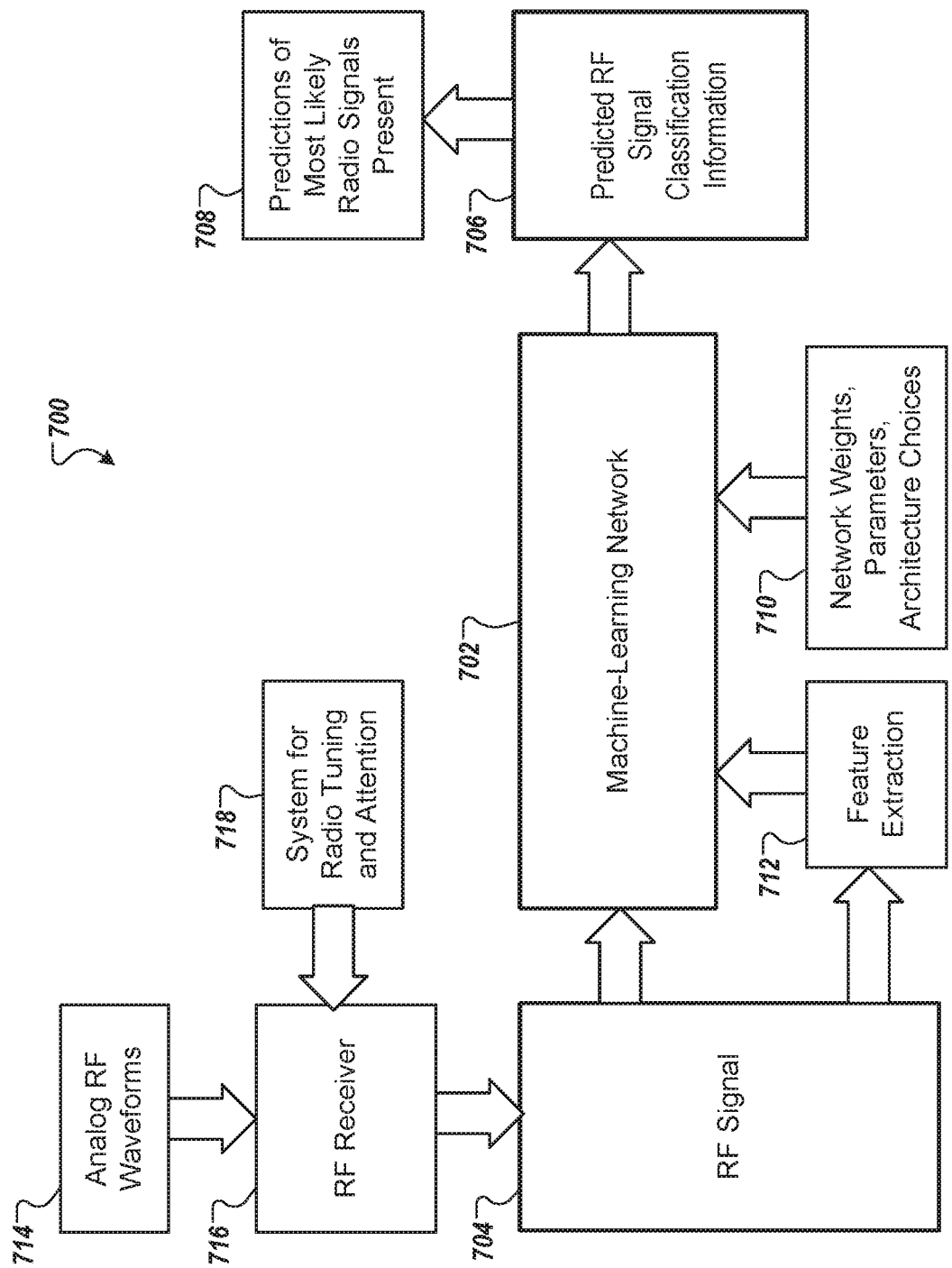
FIG. 7 illustrates an example of deploying an RF system including at least one machine-learning network that has been trained to perform learned identification of RF signals.

FIG. 7 illustrates an example system 700 of deploying an RF system including at least one machine-learning network that has been trained to perform learned identification of RF signals. The system 700 deploys learned radio signal identification based on pre-trained network features, allowing a model trained as in FIG. 5, above, to be leveraged for identification in an efficient manner.

System 700 includes a machine-learning network 702 that receives input RF signals 704 and generates predicted RF signal classification information 706. The system 700 further predicts the most likely type(s) of radio signals 708 that correspond to the input RF signal 704, based on the generated signal classification information 706. However, implementations are not limited to predicting the type(s) of radio signals, and in general may utilize the generated signal classification information 706 for any suitable classification purpose, as discussed in regards to FIG. 1.

In this example system 700, a radio waveform 714 is received and processed by a radio receiver 716, which may perform tuning and filtering to an appropriate radio band. The RF processed waveform may be converted to digital representation, for example by an analog to digital converter in the receiver 716, to generate an RF signal 704 as a discrete-time series of sampled values.

The machine-learning network 702 then utilizes a set of network parameters 710, such as network weights, biases, architecture choices, etc., which have been learned through training or architecture search, as in FIG. 5, above, to process the RF signal 704. For example, the machine-learning network 702 may implement a neural network classification model that has previously been trained, e.g., as described with respect to FIG. 5, by loading previously learned and stored model architecture choices, network weights and parameters 710 from training. In some implementations, the machine-learning network 702 may be further trained or refined during deployment, for example by utilizing feedback and/or metrics to determine performance of the classification.

In some implementations, the system 700 further includes system controller 718 for control of radio tuning and attention of the RF receiver 716. The system controller 718 may be is used to isolate and extract signals from a large collection of various types of signals present within the radio spectrum, for example, by controlling tuning, filtering, or channelization parameters in the RF receiver 716. The controller 718 may set at least one of a tuning parameter, a filtering parameter, a scheduling of operations, or a channelization parameter of the RF receiver 716 according to the trained at least one machine-learning network. In some implementations, the controller 718 may control the RF receiver 716 to effect scheduling and execution of changes in the model architecture, channelization of the RF receiver and input signals, target class labels, or specific application configuration or task based on the outcome of the classification information. In general, the controller 718 may be configured to control other aspects of the system 700 as the machine-learning network is trained. For example, the controller 718 may control the scheduling of one or more software operations that are executed by the system 700.

In some implementations, the system 700 may also include a feature extractor 712 to provide additional inputs into the machine-learning network 702, e.g., as discussed in regards to FIG. 5, above. The features that are extracted by feature extractor 712 may be used in conjunction with the RF signal 704 itself when deploying a production classification system for a given training scenario and dataset.

As such, the system 700 described above may be used to provide best estimates of over-the-air RF signals 704 to determine the type of signal that is present at the network output values 706. The network output values 706 can be used to compute which are the most likely signals 708 that are probabilistically likely to correspond to the input signal 704, and the resulting information may be transmitted to a user or a control system.

In general, the classification information 706 may be leveraged by various types of systems or processes to perform analysis of RF signals. For example, a set of automated signal reasoning systems may process the classification information 706 to analyze the RF input signals 704 to determine a similarity or difference between different RF signals, or attempt to label the RF signals with additional information. In some implementations, the automated reasoning system may determine a change of one or more RF signals 704 over time, predict future values of the RF signal 704, predict the underlying state of a communications system through which the RF signal 704 was received, or determine a difference between several known types or modes of underlying RF signals. In some implementations, the automated reasoning system may implement training mappings from the classification information 706 to alternate sequences of representations, such as words, bits, other sparse representations.

In some implementations, a user interface may be implemented to enable user interaction with the classification information 706. The user interface may generate output results that help explain to a user what types of RF signals are present, what actions may be occurring in the radio or physical environments, what spectrum resources are used or free, or other types of high-level human-interpretable information about the environment determined from a radio antenna that resulted in the original RF signal 704.

Figure 8:
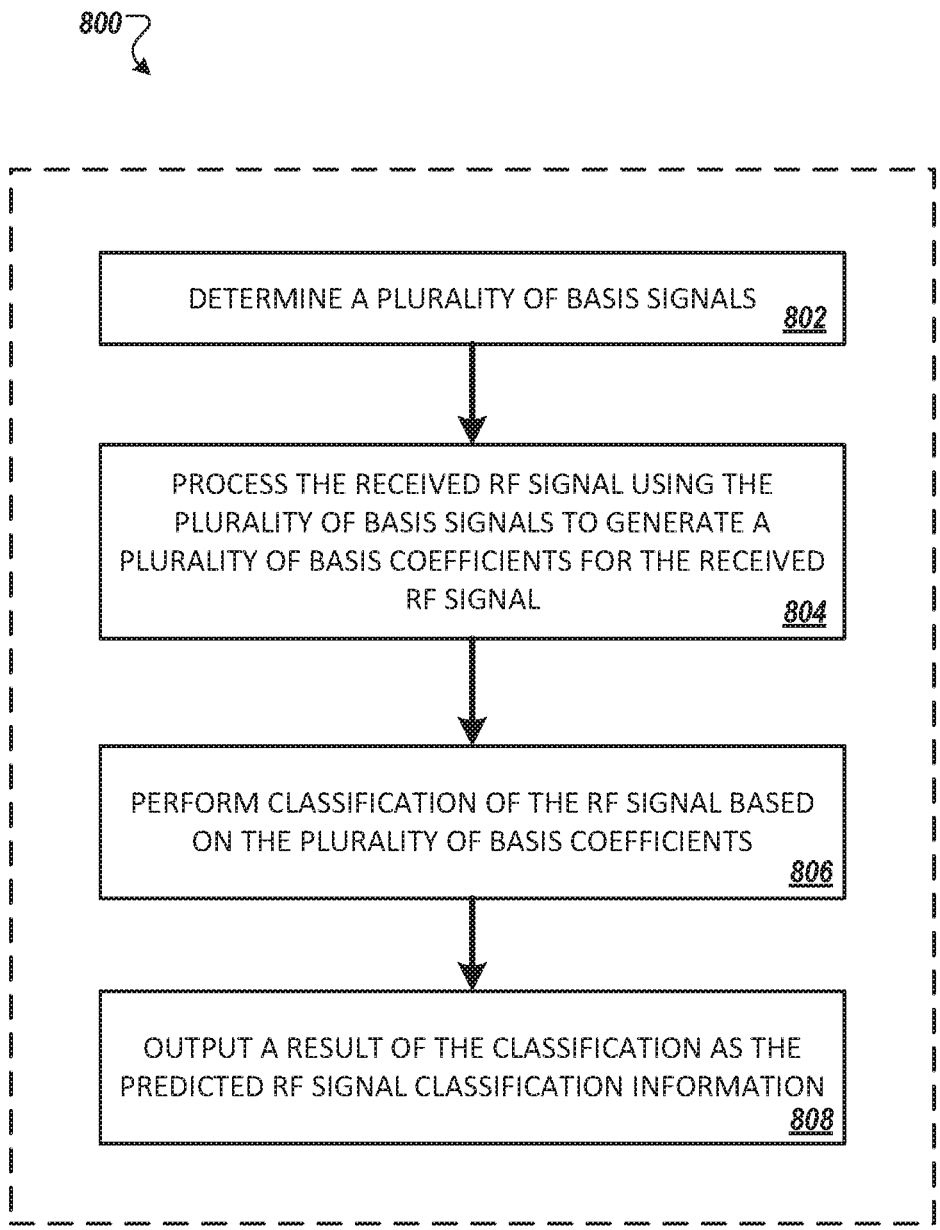
FIG. 8 is a flowchart illustrating an example method of using at least one machine-learning network to process an RF signal and generate predicted signal RF signal classification information by determining a plurality of basis signals.

FIG. 8 is a flowchart illustrating an example method 800 of using at least one machine-learning network to process an RF signal and generate predicted signal RF signal classification information by determining a plurality of basis signals. The method 800 may be implemented during training and/or deployment, for example, in step 406 of FIG. 4 and/or in step 608 of FIG. 6. Further details of using basis signals were discussed in regards to FIG. 5, above.

In this example, the method 800 includes determining a plurality of basis signals that can be used to represent the received RF signal (802). As discussed in regards to FIG. 5, above, the basis functions may be any suitable set of orthogonal or non-orthogonal set of basis functions, such as In-Phase and Quadrature-Phase (I/Q) signals, Fourier basis functions, polynomial basis functions, Gaussian basis functions, exponential basis functions, wavelet basis functions, or combinations of these and/or other suitable set of basis functions.

The method 800 further includes processing the received RF signal using the plurality of basis signals to generate a plurality of basis coefficients for the received RF signal (804). For example, as discussed in regards to FIG. 5, above, the input RF signal may be projected onto the plurality of basis signals to determine the basis coefficients. As a specific example, if the basis signals are Fourier basis functions, then a bank of filters may be implemented, each filter tuned to a particular frequency to process the input RF signal, to generate a corresponding plurality of basis coefficients.

The method 800 further includes performing classification of the RF signal based on the plurality of basis coefficients (806). The classification may directly utilize the basis coefficients, or may utilize further transformations of the basis coefficients. For example, the classification may involve using clustering algorithms or other suitable classification algorithms that determine an appropriate classification of the RF signal based on the basis coefficients.

The method 800 further includes outputting a result of the classification as the predicted RF signal classification information (808). For example, as discussed in regards to FIGS. 1 and 5, above, the classification information may include one or more labels, and may indicate deterministic or statistical classification information (e.g., likelihood probabilities).

Figure 9:
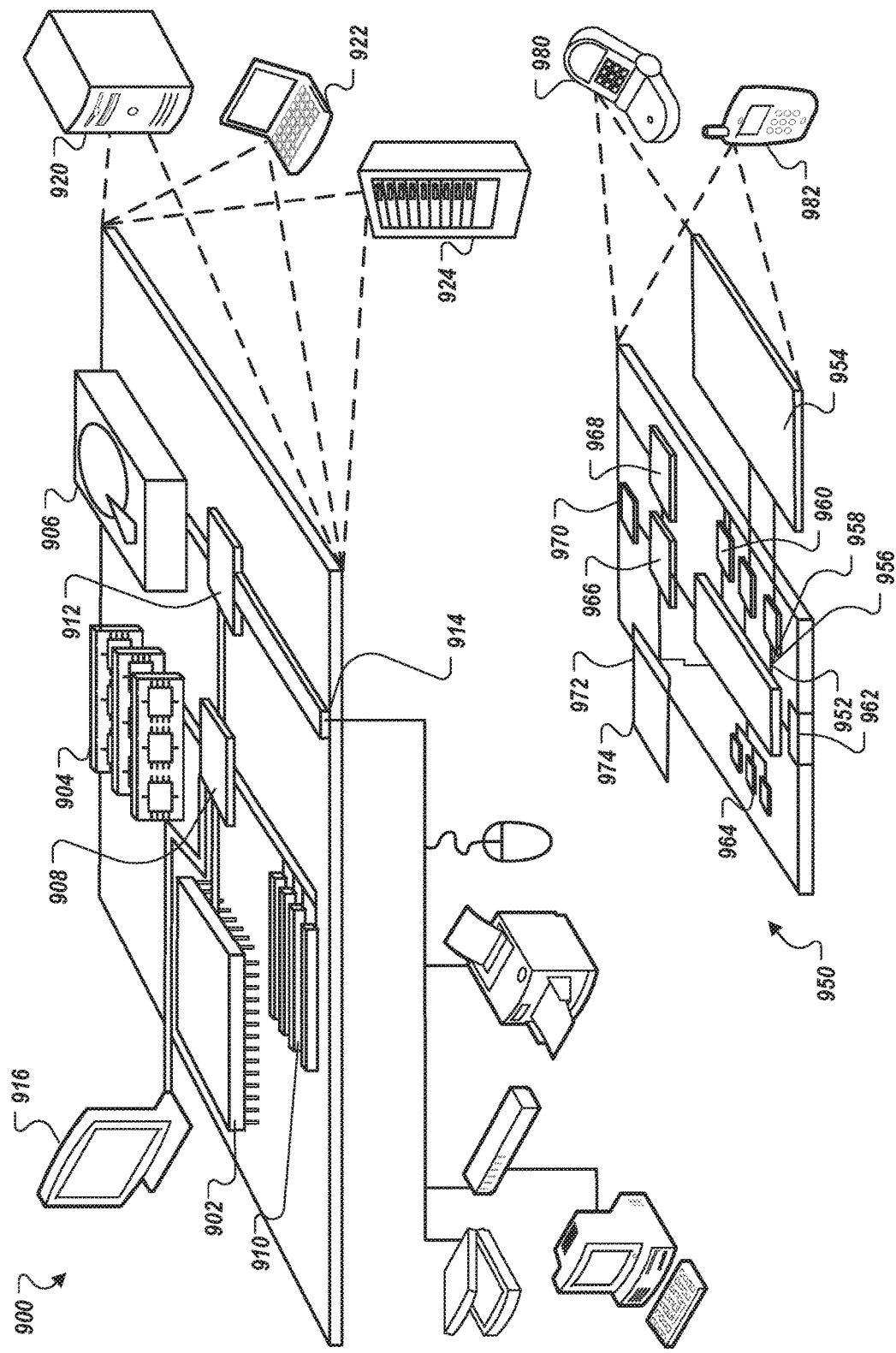
FIG. 9 is a diagram illustrating an example of a computing system that may be used to implement one or more components of an RF system that implements at least one machine-learning network to perform learned identification of RF signals.

FIG. 9 is a diagram illustrating an example of a computing system that may be used to implement one or more components of an RF system that implements at least one machine-learning network to perform learned identification of RF signals.

The example system of FIG. 9 shows a computing device 900 and a mobile computing device 950 that can be used to implement the techniques described herein. For example, one or more parts of an encoder machine-learning network system or a decoder machine-learning network system could be an example of the system 900 described here, such as a computer system implemented in any of the machine-learning networks, devices that access information from the machine-learning networks, or a server that accesses or stores information regarding the RF signal identification techniques performed by the machine-learning networks.

The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 902 is a single-threaded processor. In some implementations, the processor 902 is a multi-threaded processor. In some implementations, the processor 902 is a quantum computer.

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or may include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902).

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown), such as a mobile computing device 950. Each of such devices may include one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provide as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 968 using a radio frequency. In addition, short-range communication may occur, such as using a Bluetooth, Wi-Fi, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method of training at least one machine-learning network to classify radio frequency (RF) signals, the method performed by at least one processor executing instructions stored on at least one computer memory coupled to the at least one processor, the method comprising:
   determining an RF signal that is configured to be transmitted through an RF band of a communication medium;
   extracting one or more features of the RF signal using prior knowledge about the RF signal;
   determining first classification information associated with the RF signal based on the RF signal and the extracted one or more features of the RF signal, the first classification information comprising a representation of at least one of a characteristic of the RF signal or a characteristic of an environment in which the RF signal is communicated;
   using at least one machine-learning network to process the RF signal and generate second classification information as a prediction of the first classification information;
   calculating a measure of distance between (i) the second classification information that was generated by the at least one machine-learning network as the prediction of the first classification information, and (ii) the first classification information that was associated with the RF signal; and
   updating the at least one machine-learning network based on the measure of distance between the second classification information and the first classification information.

2. The method of claim 1, wherein the measure of distance between the second classification information and the first classification information comprises at least one of (i) a cross-entropy between the second classification information and the first classification information, or (ii) a geometric distance metric between the second classification information and the first classification information.

3. The method of claim 1, wherein the first classification information and the second classification information indicate at least one of (i) a type of modulation utilized to transmit the RF signal, (ii) a type of traffic, protocol, or standard that is carried by or that is utilized to transmit the RF signal, (iii) a type of hardware apparatus that transmits or receives the RF signal, (iv) a type of RF emission or a type of RF emission pattern occurring in the communication medium, or (v) a presence of one or more types of communications signals.

4. The method of claim 1, wherein using the at least one machine-learning network to process the RF signal and generate the second classification information comprises:
   determining a plurality of basis signals;
   processing the RF signal using the plurality of basis signals to generate a plurality of basis coefficients for the RF signal; and
   generating the second classification information based on the plurality of basis coefficients of the RF signal.

5. The method of claim 4, wherein updating the at least one machine-learning network based on the measure of distance between the second classification information and the first classification information comprises:
   updating the plurality of basis signals that are utilized to process RF signals, based on the measure of distance between the second classification information and the first classification information.

6. The method of claim 1, wherein updating the at least one machine-learning network based on the measure of distance between the second classification information and the first classification information comprises:
   determining an objective function that comprises the measure of distance between the second classification information and the first classification information;
   calculating a rate of change of the objective function relative to variations in the at least one machine-learning network;
   selecting, based on the calculated rate of change of the objective function, a variation for the at least one machine-learning network; and
   updating the at least one machine-learning network based on a selected variation for the at least one machine-learning network.

7. The method of claim 6, wherein the objective function comprises a weighted combination of the measure of distance between the second classification information and the first classification information with at least one of: (i) a computational throughput or delay achieved by the at least one machine-learning network in classifying RF signals, (ii) a computational dwell time associated with the at least one machine-learning network in classifying RF signals, or (iii) a computational duty cycle associated with the at least one machine-learning network in classifying RF signals.

8. The method of claim 1, wherein updating the at least one machine-learning network comprises:
   updating at least one network weight or at least one connection in one or more layers of at least one artificial neural network that forms part of the at least one machine-learning network.

9. The method of claim 1, wherein using the at least one machine-learning network to process the RF signal and generate the second classification information further comprises:
  determining, based on the at least one machine-learning network, a first time scale for processing the RF signal; and
  using the at least one machine-learning network to processes the RF signal based on the first time scale,
  wherein updating the at least one machine-learning network further comprises updating the first time scale to a second time scale based on the measure of distance between the second classification information and the first classification information.

10. The method of claim 1, wherein the RF signal comprises at least one of an acoustic RF signal, an optical RF signal, or other analog RF signal that is configured to be transmitted and received by man-made RF communication systems.

11. The method of claim 1, wherein the prior knowledge about the RF signal comprises features about the RF signal obtained using one or more of expert hand crafted techniques, or automated feature-extracting techniques.

12. The method of claim 1, wherein the extracted one or more features of the RF signal are trained based on results of classification performance.

13. The method of claim 1, further comprising:
  determining a type of the RF signal using the extracted one or more features of the RF signal.

14. A method of deploying at least one machine-learning network that has been trained to classify radio frequency (RF) signals, the method performed by at least one processor executing instructions stored on at least one computer memory coupled to the at least one processor, the method comprising:
  determining at least one machine-learning network has been trained to classify RF signals configured to be transmitted through an RF band of a communication medium, wherein the at least one trained machine-learning network has been trained based on a measure of distance between (i) first classification information associated with an RF training signal, wherein the first classification information was generated based on the RF training signal and one or more features of the RF training signal extracted using prior knowledge about the RF training signal, and (ii) second classification information for the RF training signal that was generated by the at least one trained machine-learning network as a prediction of the first classification information;
  setting at least one parameter of an RF receiver based on the at least one trained machine-learning network;
  using the RF receiver to receive an analog RF waveform from an RF spectrum of the communication medium, and to process the analog RF waveform to generate a discrete-time representation of the analog RF waveform as a received RF signal; and
  using the at least one trained machine-learning network to process the received RF signal and generate predicted RF signal classification information,
  wherein the predicted RF signal classification information comprises a representation of at least one of a characteristic of the received RF signal or a characteristic of an environment in which the received RF signal was communicated.

15. The method of claim 14, wherein setting the at least one parameter of the RF receiver based on the at least one machine-learning network comprises:
  setting at least one of a tuning parameter, a filtering parameter, a scheduling of operations, or a channelization parameter of the RF receiver according to the at least one trained machine-learning network, or according to updates to the at least one trained machine-learning network.

16. The method of claim 14, wherein using the at least one trained machine-learning network to process the received RF signal and generate the predicted RF signal classification information comprises:
  determining a plurality of basis signals;
  processing the received RF signal using the plurality of basis signals to generate a plurality of basis coefficients of the received RF signal; and
  perform classification on the plurality of basis coefficients of the received RF signal; and
  output a result of the classification as the predicted RF signal classification information.

17. The method of claim 14, wherein the predicted RF signal classification information indicates at least one of (i) a type of modulation utilized to transmit the received RF signal, (ii) a type of traffic, protocol, or standard that is carried by or that is utilized to transmit the received RF signal, (iii) a type of hardware apparatus that transmits or receives the received RF signal, (iv) a type of RF emission or a type of RF emission pattern occurring in the communication medium, or (v) a presence of one or more types of communications signals.

18. The method of claim 14, wherein the at least one trained machine-learning network comprises at least one artificial neural network that has been trained using an objective function that comprises the measure of distance between (i) the first classification information associated with the RF training signal, and (ii) the second classification information for the RF training signal that was generated by the at least one trained machine-learning network as the prediction of the first classification information.

19. A system comprising:
  at least one processor; and
  at least one computer memory that is operably connectable to the at least one processor and that has stored thereon instructions which, when executed by the at least one processor, cause the at least one processor to perform operations comprising:
    determining an RF signal that is configured to be transmitted through an RF band of a communication medium;
    extracting one or more features of the RF signal using prior knowledge about the RF signal;
    determining first classification information associated with the RF signal based on the RF signal and the extracted one or more features of the RF signal, the first classification information comprising a representation of at least one of a characteristic of the RF signal or a characteristic of an environment in which the RF signal is communicated;
    using at least one machine-learning network to process the RF signal and generate second classification information as a prediction of the first classification information;
    calculating a measure of distance between (i) the second classification information that was generated by the at least one machine-learning network as the prediction of the first classification information, and (ii) the first classification information that was associated with the RF signal; and updating the at least one machine-learning network based on the measure of distance between the second classification information and the first classification information.

20. The system of claim 19, wherein the measure of distance between the second classification information and the first classification information comprises at least one of (i) a cross-entropy between the second classification information and the first classification information, or (ii) a geometric distance metric between the second classification information and the first classification information.

21. The system of claim 19, wherein the first classification information and the second classification information indicate at least one of (i) a type of modulation utilized to transmit the RF signal, (ii) a type of traffic, protocol, or standard that is carried by or that is utilized to transmit the RF signal, (iii) a type of hardware apparatus that transmits or receives the RF signal, (iv) a type of RF emission or a type of RF emission pattern occurring in the communication medium, or (v) a presence of one or more types of communications signals.

22. The system of claim 19, wherein using the at least one machine-learning network to process the RF signal and generate the second classification information comprises:
    determining a plurality of basis signals;
    processing the RF signal using the plurality of basis signals to generate a plurality of basis coefficients for the RF signal; and
    generating the second classification information based on the plurality of basis coefficients of the RF signal.

23. The system of claim 22, wherein updating the at least one machine-learning network based on the measure of distance between the second classification information and the first classification information comprises:
    updating the plurality of basis signals that are utilized to process RF signals, based on the measure of distance between the second classification information and the first classification information.

24. The system of claim 19, wherein updating the at least one machine-learning network based on the measure of distance between the second classification information and the first classification information comprises:
    determining an objective function that comprises the measure of distance between the second classification information and the first classification information;
    calculating a rate of change of the objective function relative to variations in the at least one machine-learning network;
    selecting, based on the calculated rate of change of the objective function, a variation for the at least one machine-learning network; and
    updating the at least one machine-learning network based on a selected variation for the at least one machine-learning network.

25. The system of claim 24, wherein the objective function comprises a weighted combination of the measure of distance between the second classification information and the first classification information with at least one of: (i) a computational throughput or delay achieved by the at least one machine-learning network in classifying RF signals, (ii) a computational dwell time associated with the at least one machine-learning network in classifying RF signals, or (iii) a computational duty cycle associated with the at least one machine-learning network in classifying RF signals.

26. The system of claim 19, wherein updating the at least one machine-learning network comprises:
    updating at least one network weight or at least one connection in one or more layers of at least one artificial neural network that forms part of the at least one machine-learning network.

27. The system of claim 19, wherein using the at least one machine-learning network to process the RF signal and generate the second classification information further comprises:
    determining, based on the at least one machine-learning network, a first time scale for processing the RF signal; and
    using the at least one machine-learning network to processes the RF signal based on the first time scale,
    wherein updating the at least one machine-learning network further comprises updating the first time scale to a second time scale based on the measure of distance between the second classification information and the first classification information.

28. The system of claim 19, wherein the RF signal comprises at least one of an acoustic RF signal, an optical RF signal, or other analog RF signal that is configured to be transmitted and received by man-made RF communication systems.

29. The system of claim 19, wherein the prior knowledge about the RF signal comprises features about the RF signal obtained using one or more of expert hand crafted techniques, or automated feature-extracting techniques.

30. The system of claim 19, wherein the extracted one or more features of the RF signal are trained based on results of classification performance.

31. The system of claim 19, wherein the operations further comprise:
    determining a type of the RF signal using the extracted one or more features of the RF signal.

32. A system comprising:
    at least one processor; and
    at least one computer memory that is operably connectable to the at least one processor and that has stored thereon instructions which, when executed by the at least one processor, cause the at least one processor to perform operations comprising:
    determining at least one machine-learning network has been trained to classify RF signals configured to be transmitted through an RF band of a communication medium, wherein the at least one trained machine-learning network has been trained based on a measure of distance between (i) first classification information for an RF training signal, wherein the first classification information was generated based on the RF training signal and one or more features of the RF training signal extracted using prior knowledge about the RF training signal, and (ii) second classification information for the RF training signal that was generated by the at least one trained machine-learning network as a prediction of the first classification information;
    setting at least one parameter of an RF receiver based on the at least one trained machine-learning network;
    using the RF receiver to receive an analog RF waveform from an RF spectrum of the communication medium, and to process the analog RF waveform to generate a discrete-time representation of the analog RF waveform as a received RF signal; and
    using the at least one trained machine-learning network to process the received RF signal and generate predicted RF signal classification information, wherein the predicted RF signal classification information comprises a representation of at least one of a characteristic of the received RF signal or a characteristic of an environment in which the received RF signal was communicated.

33. The system of claim 32, wherein setting the at least one parameter of the RF receiver based on the at least one machine-learning network comprises:

setting at least one of a tuning parameter, a filtering parameter, or a channelization parameter of the RF receiver according to the at least one trained machine-learning network, or according to updates to the at least one trained machine-learning network.

34. The system of claim 32, wherein using the at least one trained machine-learning network to process the received RF signal and generate the predicted RF signal classification information comprises:

determining a plurality of basis signals;

processing the received RF signal using the plurality of basis signals to generate a plurality of basis coefficients of the received RF signal; and perform classification on the plurality of basis coefficients of the received RF signal; and output a result of the classification as the predicted RF signal classification information.

35. The system of claim 32, wherein the predicted RF signal classification information indicates at least one of (i) a type of modulation utilized to transmit the received RF signal, (ii) a type of traffic, protocol, or standard that is carried by or that is utilized to transmit the received RF signal, (iii) a type of hardware apparatus that transmits or receives the received RF signal, (iv) a type of RF emission or a type of RF emission pattern occurring in the communication medium, or (v) a presence of one or more types of communications signals.

36. The system of claim 32, wherein the at least one trained machine-learning network comprises at least one artificial neural network that has been trained using an objective function that comprises the measure of distance between (i) the first classification information associated with the RF training signal, and (ii) the second classification information for the RF training signal that was generated by the at least one trained machine-learning network as the prediction of the first classification information.

* * * * *

UNITED STATES PATENT AND TRADEMARK OFFICE
CERTIFICATE OF CORRECTION

| | | |
|---|---|---|
| PATENT NO. | : 10,643,153 B2 | Page 1 of 1 |
| APPLICATION NO. | : 15/961465 | |
| DATED | : May 5, 2020 | |
| INVENTOR(S) | : Timothy James O'Shea | |

It is certified that error appears in the above-identified patent and that said Letters Patent is hereby corrected as shown below:

In the Specification

At Column 1, Line 3, after the title, please insert the following section:
--STATEMENT REGARDING FEDERALLY SPONSORED RESEARCH OR DEVELOPMENT
This invention was made with government support under agreement HR0011-16-1-0002 awarded by U.S. Defense Advanced Research Projects Agency. The government has certain rights in the invention.--.

Signed and Sealed this
Fourth Day of July, 2023

Katherine Kelly Vidal
*Director of the United States Patent and Trademark Office*